(12) United States Patent
Sakurai et al.

(10) Patent No.: US 11,019,322 B2
(45) Date of Patent: May 25, 2021

(54) ESTIMATION SYSTEM AND AUTOMOBILE

(71) Applicant: KABUSHIKI KAISHA TOSHIBA, Tokyo (JP)

(72) Inventors: Tatsuma Sakurai, Tokyo (JP); Takuma Yamamoto, Kanagawa (JP); Nao Mishima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 297 days.

(21) Appl. No.: 15/908,771

(22) Filed: Feb. 28, 2018

(65) Prior Publication Data

US 2019/0007670 A1  Jan. 3, 2019

(30) Foreign Application Priority Data

Jun. 29, 2017  (JP) .............................. JP2017-127389

(51) Int. Cl.
| | |
|---|---|
| *H04N 13/00* | (2018.01) |
| *H04N 13/161* | (2018.01) |
| *G06T 7/73* | (2017.01) |
| *G05D 1/02* | (2020.01) |
| *H04N 13/207* | (2018.01) |
| *G06T 7/529* | (2017.01) |
| *G06T 7/536* | (2017.01) |

(52) U.S. Cl.
CPC ......... *H04N 13/161* (2018.05); *G05D 1/0246* (2013.01); *G05D 1/0274* (2013.01); *G06T 7/529* (2017.01); *G06T 7/536* (2017.01); *G06T 7/73* (2017.01); *H04N 13/207* (2018.05); *G06T 2207/10028* (2013.01); *G06T 2207/30244* (2013.01); *H04N 2013/0081* (2013.01)

(58) Field of Classification Search
CPC . H04N 5/00; H04N 13/00; G06T 7/00; G06K 9/00
See application file for complete search history.

(56) References Cited

U.S. PATENT DOCUMENTS

| | | | |
|---|---|---|---|
| 2008/0304707 A1* | 12/2008 | Oi | ...................... G06K 9/00664 382/103 |
| 2009/0284627 A1 | 11/2009 | Bando et al. | |
| 2013/0182906 A1 | 7/2013 | Kojo et al. | |

(Continued)

FOREIGN PATENT DOCUMENTS

| | | |
|---|---|---|
| CN | 103154666 A | 6/2013 |
| JP | 2008-304268 | 12/2008 |

(Continued)

OTHER PUBLICATIONS

Raul Mur-Artal et al., "ORB-SLAM2: an Open-Source SLAM System for Monocular, Stereo and RGB-D Cameras," IEEE Transactions on Robotics (vol. 33, No. 5) Jun. 12, 2017, pp. 1255-1262 (pp. 1-8) retrieved Feb. 3, 2018 from: https://arxiv.org/pdf/1610.06475.

*Primary Examiner* — Maryam A Nasri
(74) *Attorney, Agent, or Firm* — Finnegan, Henderson, Farabow, Garrett & Dunner L.L.P.

(57) ABSTRACT

According to one embodiment, an estimation system includes a monocular imaging unit and processing circuitry. The monocular imaging unit acquires, at a time of capturing, an image and first data relating to an actual distance to an object captured in the image. The processing circuitry estimates a position of the imaging unit by using the image and the first data.

20 Claims, 14 Drawing Sheets

(56) References Cited

U.S. PATENT DOCUMENTS

| | | | |
|---|---|---|---|
| 2013/0308005 A1 | 11/2013 | Takahashi | |
| 2014/0225985 A1* | 8/2014 | Klusza | H04N 13/271 |
| | | | 348/43 |
| 2015/0274421 A1 | 10/2015 | Yamada | |
| 2016/0154152 A1* | 6/2016 | Moriuchi | H04N 5/2254 |
| | | | 348/374 |
| 2017/0054910 A1 | 2/2017 | Moriuchi et al. | |

FOREIGN PATENT DOCUMENTS

| | | |
|---|---|---|
| JP | 2009-276294 | 11/2009 |
| JP | 2014-26051 | 2/2014 |
| JP | 2015-196600 A | 11/2015 |
| JP | 2016-102733 | 6/2016 |
| JP | 2017-40642 | 2/2017 |
| JP | 2017-92983 A | 5/2017 |

\* cited by examiner

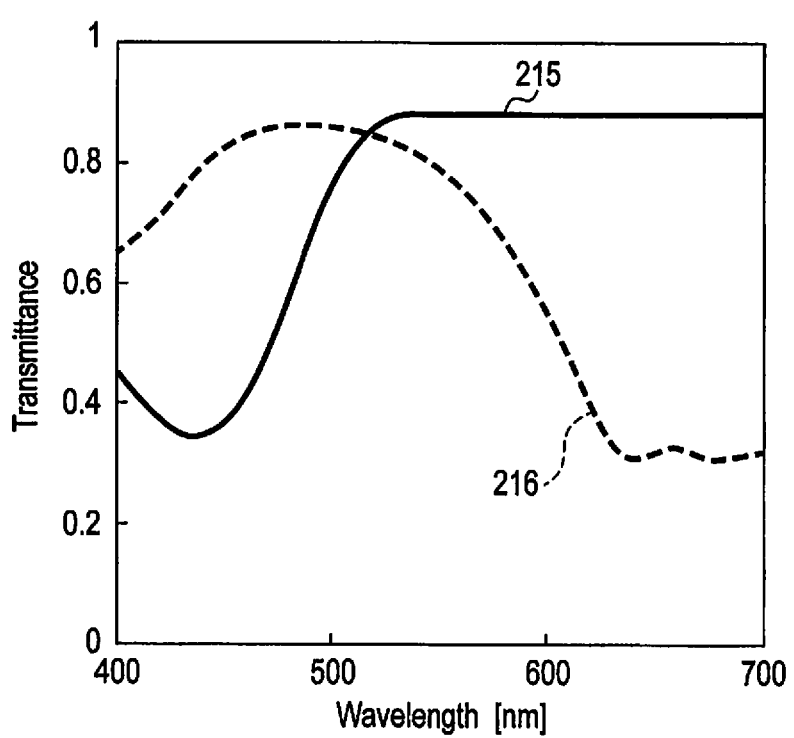
F I G. 5

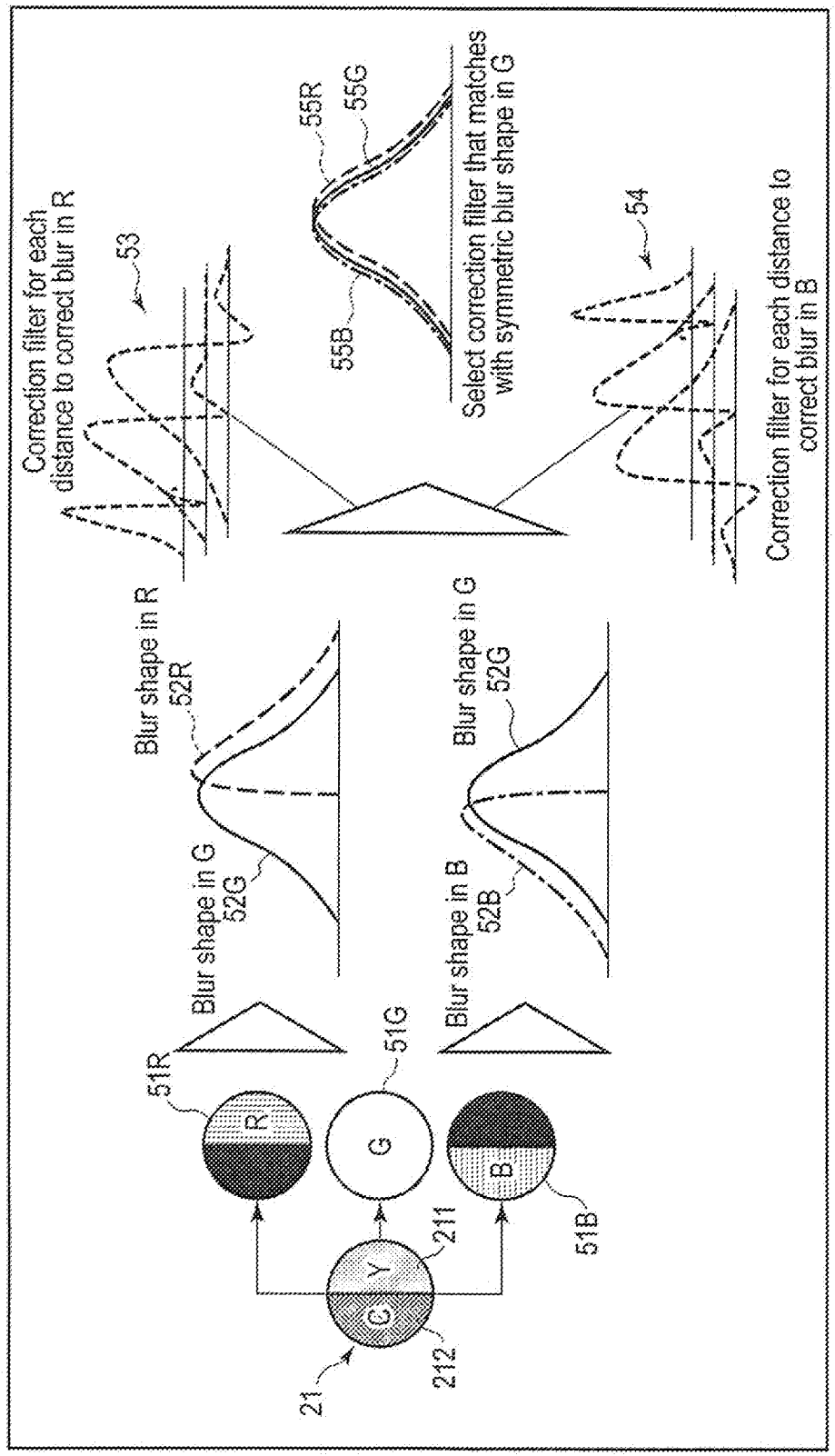
F I G. 7

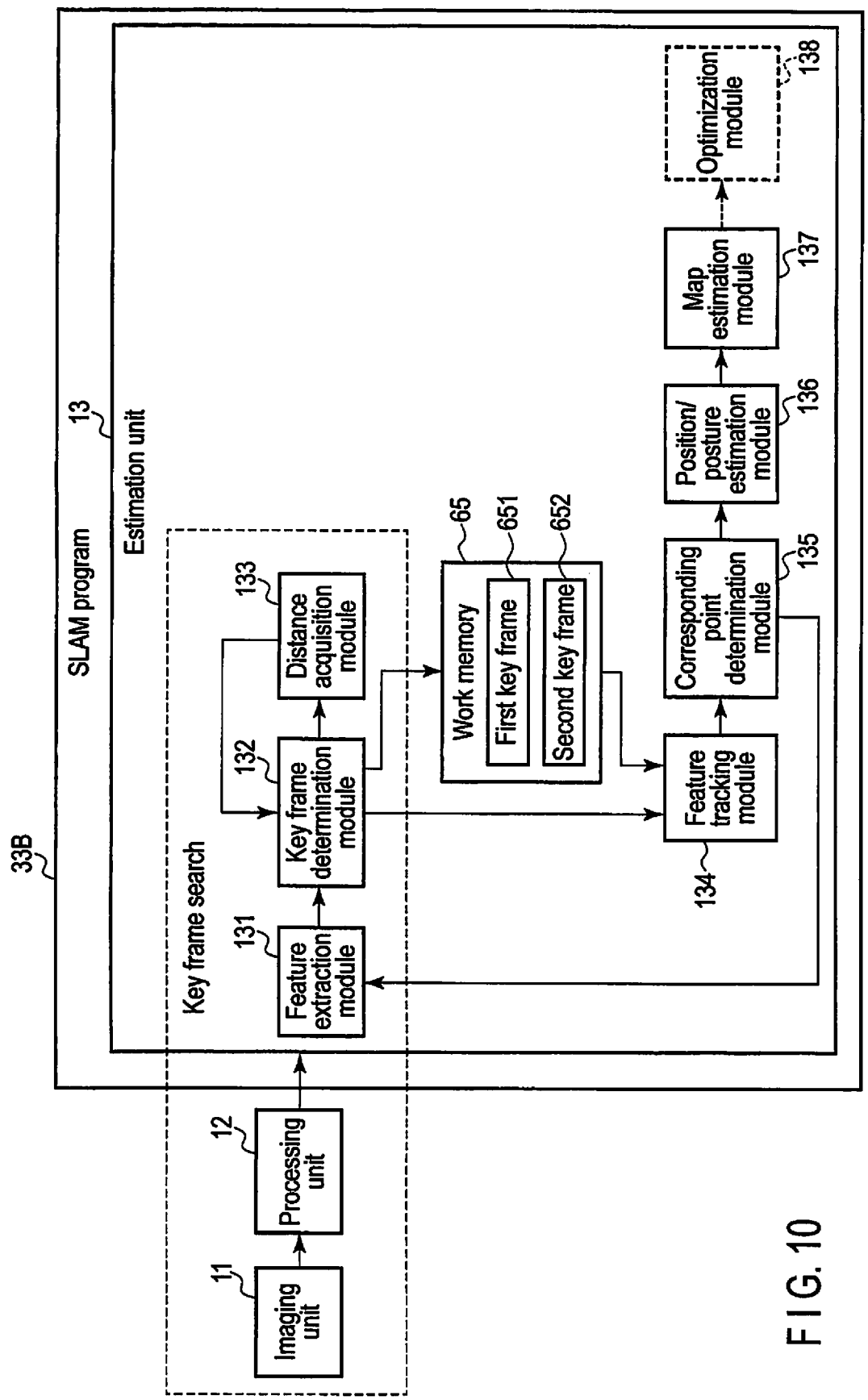
F I G. 10

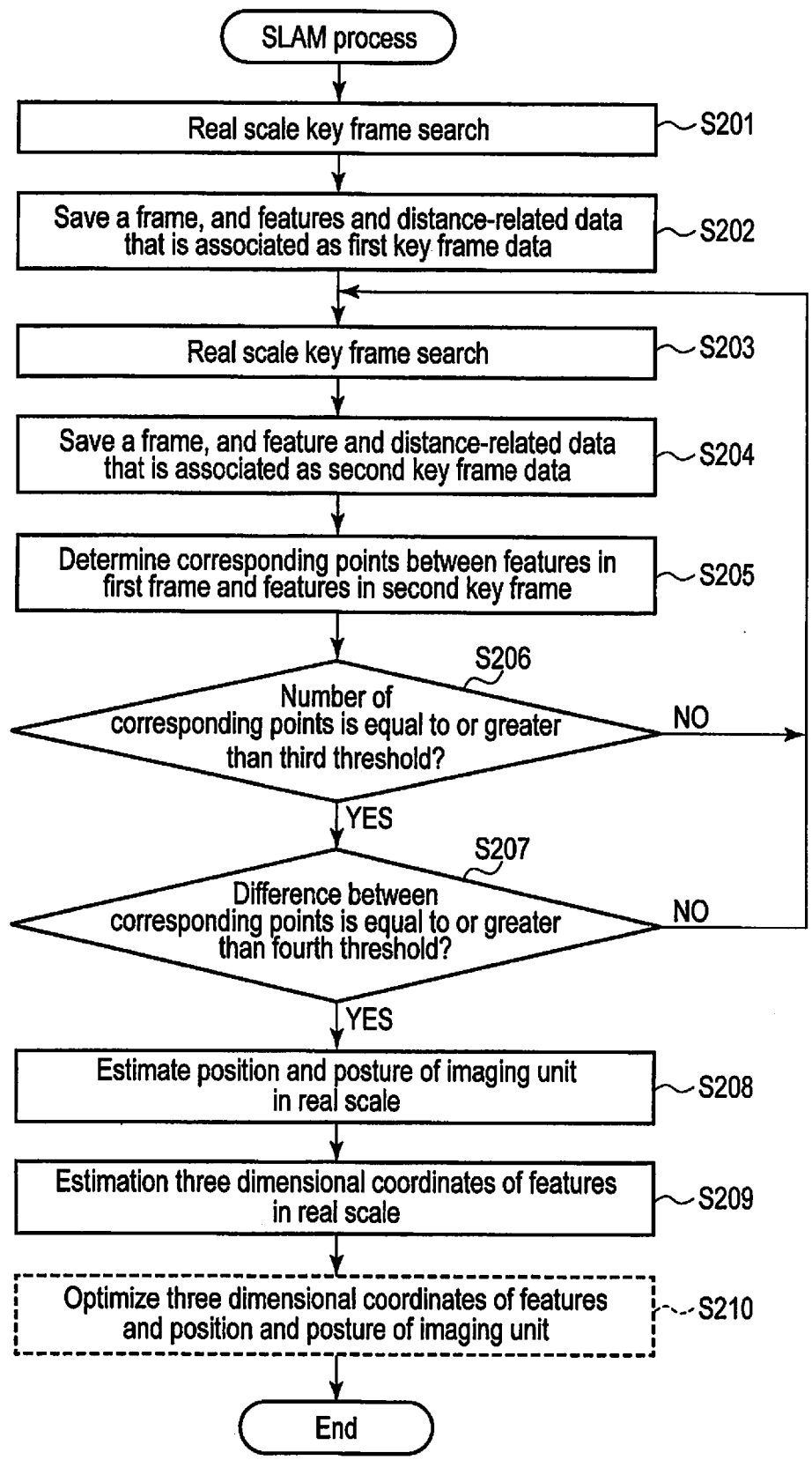
F I G. 12

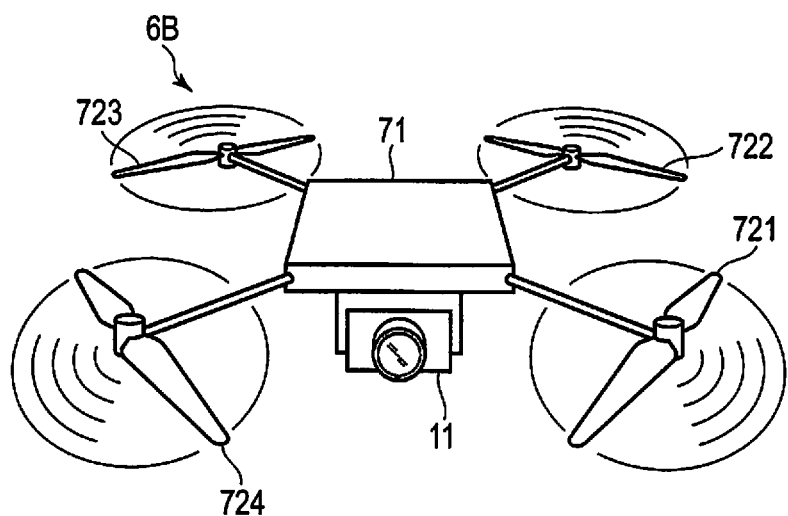
F I G. 17
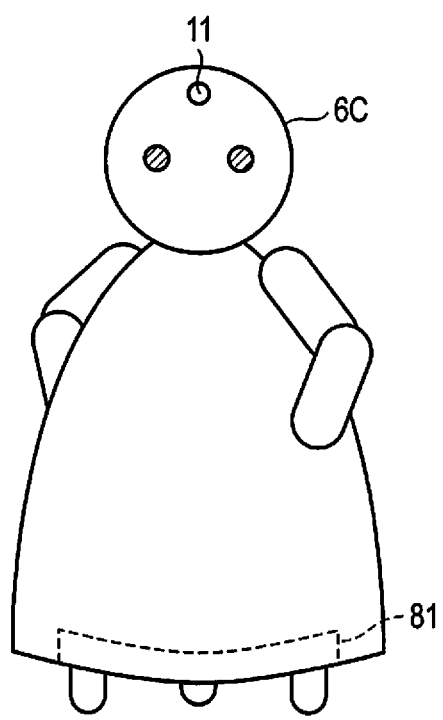
F I G. 18

ESTIMATION SYSTEM AND AUTOMOBILE

CROSS-REFERENCE TO RELATED APPLICATIONS

This application is based upon and claims the benefit of priority from Japanese Patent Application No. 2017-127389, filed Jun. 29, 2017, the entire contents of which are incorporated herein by reference.

FIELD

Embodiments described herein relate generally to an estimation system and an automobile to which the estimation system is applied.

BACKGROUND

In recent years, estimation techniques of a position and posture of a robot or the like are used. For example, when a movable body such as a robot or an automobile moves in an unknown environment, the position and posture estimation techniques are used to create a map of peripheral environment of the body from data obtained by a camera or a sensor and to estimate the position and posture of the body on the map. Furthermore, the position and posture of the body and the map are used to create an efficient movement path and the like.

In order to determine a path of a movable body in an actual space, a position to be estimated must be based on an actual distance.

BRIEF DESCRIPTION OF THE DRAWINGS

FIG. 5 shows an example of transmittance characteristics of the filter of FIG. 3.

FIG. 7 shows an example of a method of calculating a distance to an object using blur on an image captured by the image capture device of FIG. 2.

FIG. 10 is an exemplary block diagram showing a functional configuration of the information processing apparatus of FIG. 8.

FIG. 12 is a flowchart of an example of the procedure of a simultaneous localization and mapping (SLAM) process executed by the estimation system of the embodiment.

FIG. 17 is an exemplary perspective view of the exterior of a drone including the estimation system of the embodiment.

FIG. 18 is an exemplary perspective view of the exterior of a robot including the estimation system of the embodiment.

DETAILED DESCRIPTION

In general, according to one embodiment, an estimation system includes a monocular imaging unit and processing circuitry. The monocular imaging unit is configured to acquire, at a time of capturing, an image and first data relating to an actual distance to an object captured in the image. The processing circuitry is configured to estimate a position of the imaging unit by using the image and the first data.

Various embodiments will be described hereinafter with reference to the accompanying drawings.

Figure 1:
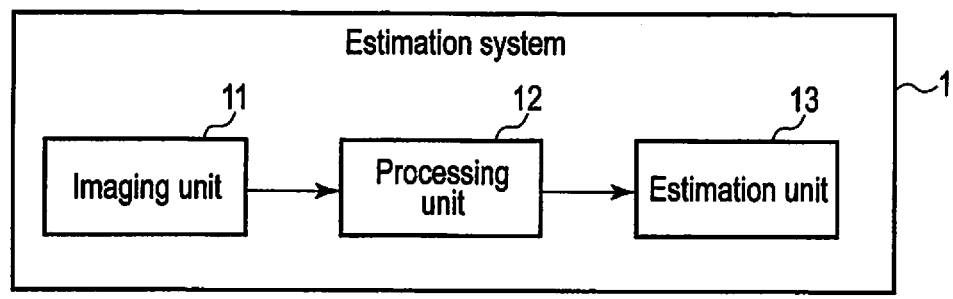
FIG. 1 is an exemplary block diagram of the configuration of an estimation system of an embodiment.

Firstly, an estimation system of an embodiment will be described with reference to FIG. 1. The estimation system 1 may be realized as a camera, a computer including a camera, a camera and a computer which can mutually receive and transmit data, or a system incorporated into various electronic apparatuses. The estimation system 1 includes, for example, an imaging unit 11, a processing unit 12, and an estimation unit 13.

When capturing an image of an object, the imaging unit 11 acquires an image in which an actual distance between the object and the imaging unit 11 (camera) is encoded. The imaging unit 11 includes at least one camera (for example, a monocular camera) and an encoding aperture in the aperture part of the camera to capture an image in which the distance from the object to the imaging unit 11 is encoded. That is, the imaging unit 11 can capture, at a time of capturing, an image and data relating to the distance to the object in the image by a monocular camera. The imaging unit 11 generates encoded data as an image obtained by the capturing and outputs the encoded data to the processing unit 12.

Encode of distance is achieved by changing an image capture process. For example, at least one of phase, wavelength, and strength of light rays incident on the aperture part of the camera is changed. A specific process in consideration of the changing characteristics is subjected to a captured image based on changing light rays, thereby calculating (estimating) the distance encoded in the captured image. The imaging unit 11 is not limited to the encoding aperture type, and may adopt any other type of computational photography which can record image and distance data in synchronization.

The processing unit 12 processes the encoded data to convert the encoded data into an image and data relating to distances (distance-related data). Specific examples of the conversion will be explained with reference to FIGS. 2 to 7. The processing unit 12 outputs the image and the distance-related data to the estimation unit 13.

By using the encoded data, the estimation unit 13 estimates at least one of self-position, self-posture, and map based on the actual distance. Specifically, the estimation unit 13 estimates, for example, by using the image and the distance-related data to estimate at least one of self-position, self-posture, and map based on the actual distance. A position and coordinates based on the actual distance are represented as a position and coordinates in a three dimensional space of actual size. The estimation unit 13 estimates, for example, the self-position.

The self-position indicates, for example, a position of the imaging unit 11. Furthermore, the self-posture may be a posture with respect to a reference axis. Note that the self-position is not limited to the position of the imaging unit 11, and may be an arbitrary position. A positional relationship between such an arbitrary position and the imaging unit 11 may be acquired preliminarily. As such a self-position, for example, a center position of the imaging unit 11 or a movable body (for example, automobile, robot, and the like) with which the estimation system 1 including the imaging unit 11 is provided. The self-posture indicates, for example, a posture of an optical axis of a lens provided with the imaging unit 11. The map is represented by, for example, three dimensional coordinates corresponding to features on the image. The map is, for example, a map of an area including the self-position. The map is represented in, for example, a three dimension. By using the image and distance-related data, the estimation unit 13 performs, for example, a simultaneous localization and mapping (SLAM) process, thereby estimating at least one of a self-position, a self-posture, and a map based on the real scale (full scale).

The position and coordinates based on the real scale are represented as position and coordinates in a three dimensional space of actual size. Thus, for example, when a self-position and three dimensional coordinates of points on the map are estimated, a distance between the estimated self-position and a certain point (or three dimensional coordinates) on the map corresponds to an actual distance between the self-position and a point on the object which corresponds to the certain point on the map in an actual space of the image capture target, and the actual distance substantially matches with the distance derived from the estimation with highly precision.

The estimation unit 13 can estimate at least one of a self-position, a self-posture, and a map based on the real scale using, for example, RGB-D SLAM. RGB-D SLAM is a method using an RGB image and a depth map, and thus, can be applied to the estimation system 1 using the image and distance-related data. In general, an RGB image and a depth map must be synchronized based on a time stamp of a time when the data is acquired, that is, a time stamp indicative of a time when the RGB image is acquired by the camera and a time stamp indicative of a time when the depth map is acquired by a distance sensor or the like. In contrast, since the image and distance-related data used in the estimation system 1 of the present embodiment is acquired by a monocular camera including, for example, the encoding aperture (for example, color aperture), the image and distance-related data are already synchronized. Thus, the estimation system 1 does not require a data synchronization process, and thus, a cost for calculation can be reduced and a device for synchronization process can be omitted.

Or, the estimation unit 13 can estimate a self-position, a self-posture, and a map from an image based on a relative scale using, for example, monocular SLAM. Then, the estimation unit 13 further uses distance-related data to enlarge or reduce (that is, scale up or down) the estimated self-position, self-posture, and map based on the real scale, thereby estimating the self-position, self-posture, and map based on the real scale (actual distance).

The estimation unit 13 can perform a SLAM process by applying various SLAM methods instead of the above-mentioned RGB-D SLAM and monocular SLAM.

The estimation of self-position, self-posture, and map based on the real scale may be performed by, for example, a method using a stereo camera, a method using a monocular camera and a distance sensor, a method using a monocular camera and dictionary data relating to an object, or the like. In the method using a stereo camera and the method using the monocular camera and the distance sensor, a space to accommodate cameras and sensors in a movable body is required, and data must be synchronized between the cameras and sensors. Furthermore, in the method using a monocular camera and dictionary data relating to an object, dictionary data relating to a three dimensional shape of an object must be prepared, and the object indicated in the dictionary data must be captured to perform the estimation based on the real scale. Since the estimation system 1 of the present embodiment acquires an image and distance information at a time of capturing by using a monocular camera, synchronization of the image and the distance information is not necessary, and dictionary data of objects is not required. Thus, the self-position, self-posture and map can easily be estimated.

Note that the imaging unit 11, the processing unit 12, and the estimation unit 13 of the estimation system 1 may be provided within one device or may be separately provided with several devices. In the following description, the estimation system 1 includes an image capture device including an imaging unit 11 and the processing unit 12, and an information pressing apparatus which can mutually receive and transmit data with the image capture device. Note that the processing unit 12 may be incorporated in the information processing apparatus instead of the image capture device.

Figure 2:
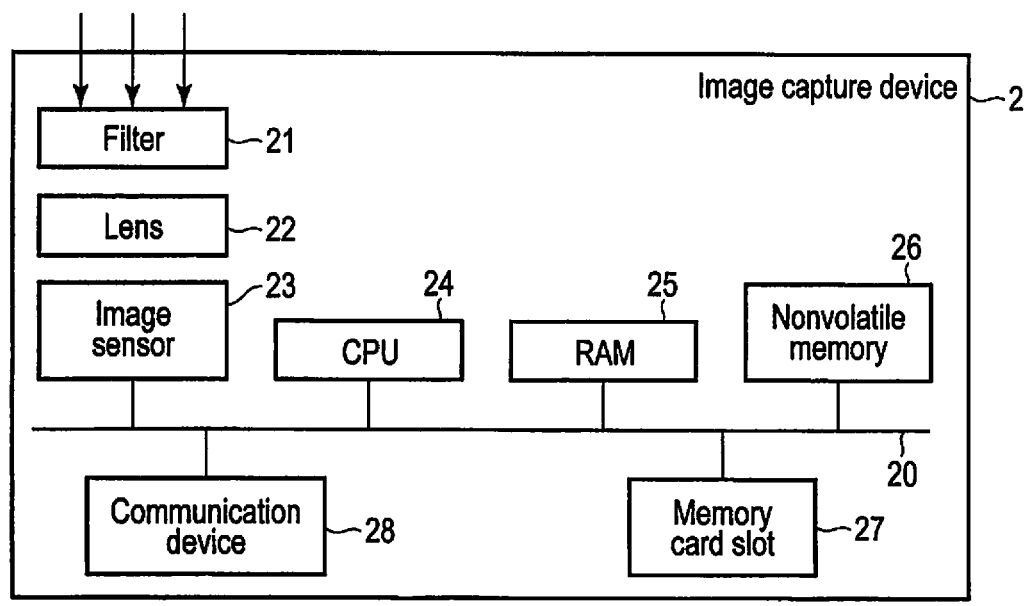
FIG. 2 is a block diagram of an example of a system configuration of an image capture device used in the estimation system of the embodiment.

FIG. 2 shows a system configuration of the image capture device 2 including the imaging unit 11 and the processing unit 12. The imaging unit 11 includes, for example, a filter 21, a lens 22, and an image sensor 23. The processing unit 12 is composed of, for example, a CPU 24. The image capture device 2 further includes a memory unit. The memory unit includes, for example, a RAM 25, a nonvolatile memory 26, and a memory card slot 27. The image capture device 2 may further include a communication device 28. The CPU 24 functions as the processing unit 12 by, for example, executing a specific program loaded from the nonvolatile memory 26 to the RAM 25. The image sensor 23, the CPU 24, the RAM 25, the nonvolatile memory 26, the memory card slot 27, and the communication device 28 may be mutually connected via a bus 20, for example.

The image sensor 23 receives light rays passing through the filter 21 and the lens 22 and converts the received light rays into electric signals (photoelectric conversion). The image sensor 23 may be, for example, charge coupled device (CCD) or a complementary metal oxide semiconductor (CMOS). The image sensor 23 includes, for example, imaging elements receiving red (R) light rays, imaging elements receiving green (G) light rays, and imaging elements receiving blue (B) light rays. Each image capture elements receive light rays of corresponding wavelength band (waveband) and converts the received light rays into electric signals. By performing analog to digital conversion of the electric signals, a color image can be generated. In the following description, R, G, and B components of the image may be referred to as R, G, and B images, respectively. Note that R, G, and B images may be generated by using electric signals of each of red, green, and blue imaging elements.

The CPU 24 includes one or more processors configured to control operations of various components in the image capture device 2. The CPU 24 executes various programs loaded from the nonvolatile memory 26 to the RAM 25. The nonvolatile memory 26 may store captured images based on electric signals output from the image sensor 23 and results obtained by processing the images.

Various detachable memory medium such as an SD card and an SDHC memory card may be inserted in the memory card slot 27. When a memory medium is inserted in the memory card slot 27, data write and read with respect to the memory medium may be performed. The data includes, for example, image data and distance-related data.

The communication device 28 is an interface device configured to execute wired communication or wireless communication. The communication device 28 includes a transmitter which transmits signals through wire or wirelessly and a receiver which receives signals through wire or wirelessly.

Figure 3:
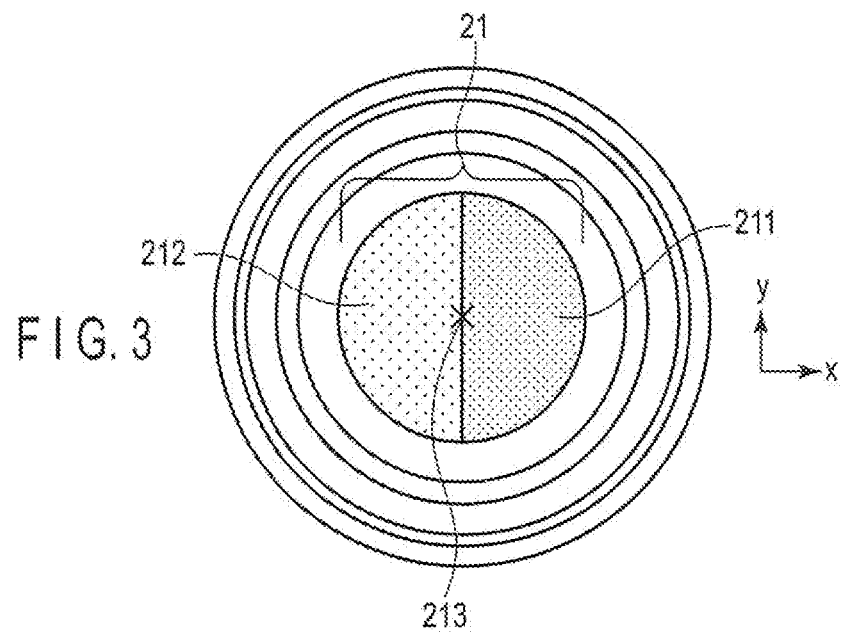
FIG. 3 shows an example of the structure of a filter provided with the image capture device of FIG. 2.

FIG. 3 shows an example of the structure of the filter 21. The filter 21 includes filter areas which pass different wavelength bands (color components) of light rays. Two or more of the filter areas are shaped asymmetrically with respect to the optical center 213 of the image capture device 2. The filter 21 includes, for example, two color filter areas of the first filter area 211 and the second filter area 212. The center of the filter 21 matches the optical center 213 of the image capture device 2. The first filter area 211 and the second filter area 212 are each shaped asymmetrically with respect to the optical center 213. Furthermore, for example, the two filter areas 211 and 212 do not overlap and the two filter areas 211 and 212 form the entire area of the filter 21. In the example of FIG. 3, each of the first filter area 211 and the second filter area 212 is shaped as a half circle divided by a line segment passing the optical center 213 of the filter 21 of circle shape. The first filter area 211 is, for example, a yellow (Y) filter area, and the second filter area 212 is, for example, a cyan (C) filter area. Note that, the first filter area 211 may be a magenta (M) filter area and the second filter area 212 may be a yellow (Y) filter area. Furthermore, the first filter area 211 may be a cyan (C) filter area and the second filter area 212 may be a magenta (M) filter area.

Each color filter passes light rays of a wavelength band different from each other. Part of the wavelength band of light rays passing through one filter area and part of the wavelength band of light rays passing through another filter area may overlap with each other, for example. Part of the wavelength band of light rays passing through one filter area may include part of the wavelength band of light rays passing through another filter area.

Note that the first filter area 211 and the second filter area 212 may be a filter which changes transmittance of an arbitrary wavelength band, a polarization filter which passes polarization light rays of an arbitrary direction, or a micro lens which changes condensing power of an arbitrary wavelength band. For example, the filter which changes light rays of an arbitrary wavelength band may be a primary color filter (RGB), a complementary color filter (CMY), a color correction filter (CC-RGB/CMY), an infrared/ultraviolet cut filter, an ND filter, or a shielding plate. If the first filter area 211 and the second filter area 212 are realized by micro lenses, a blur shape changes because of the lens 22 biasing distribution of condensed light rays.

Figure 4:
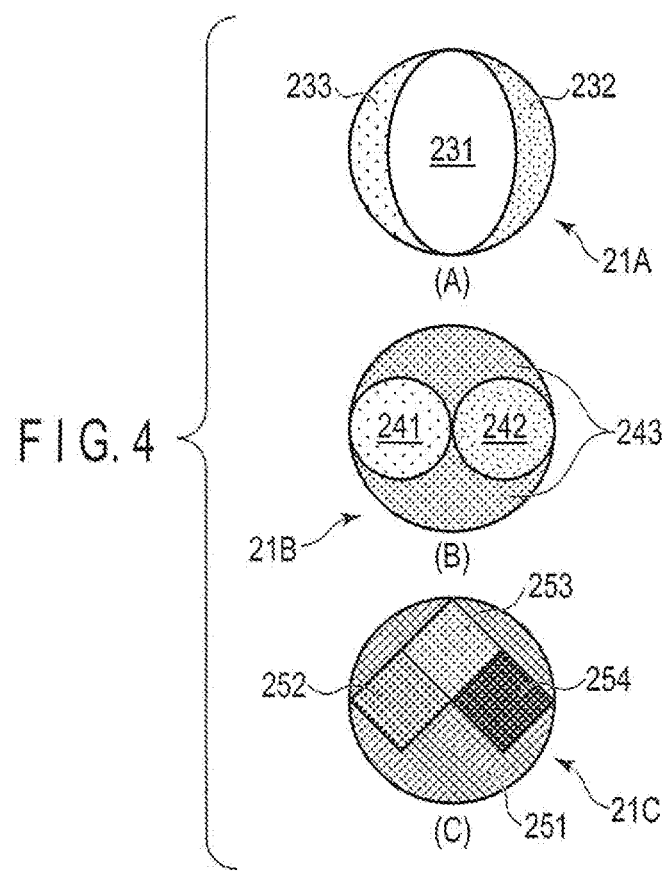
FIG. 4 shows another example of the structure of a filter provided with the image capture device of FIG. 2.

Furthermore, FIG. 4 shows examples of filters 21A, 21B, and 21C. Each of the filters 21A, 21B, and 21C includes three or more color filter areas. Each of the filters 21A, 21B, and 21C may be used instead of the filter 21. As described above, each filter area is shaped asymmetrically with respect to the optical center 213 of the image capture device 2.

The filter 21A of FIG. 4(A) includes three filter areas 231, 232, and 233. The first filter area 231 has an eye-like shape which is symmetric with respect to a line segment passing the optical center 213. The second filter area 232 and the third filter area 233 each have a crescent shape and are adjacent to the eye-shaped first filter area 231 in its right and left sides. The filter areas 231, 232, and 233 do not overlap and the three filter areas 231, 232, and 233 form the entire area of the filter 21A. The first filter area 231 is, for example, a transparent filter area, the second filter area 232 is, for example, a yellow (Y) filter area, and the third filter area 233 is, for example, a cyan (C) filter area. Note that the second filter area 232 may be a magenta (M) filter area, and the third filter area 233 may be a yellow (Y) filter area. Furthermore, the second filter area 232 may be a cyan (C) filter area, and the third filter area 233 may be a magenta (M) filter area. In the filter 21A, the light rays of all kinds passes the first filter area 231 including the center area, and thus, an image based on the light rays passing with high transmittance (for example, 90%) can be obtained.

The filter 21B of FIG. 4(B) includes three filter areas 241, 242, and 243. The first filter area 241 and the second filter area 242 each include a circle having a diameter half the diameter of the filter 21B of circle shape, and the filter areas 241 and 242 are disposed symmetrically with respect to a line segment passing the optical center 213 of the lens 22. A remaining area on the filter 21B excluding the first filter area 241 and the second filter area 242 is the third filter area 243. The first filter area 241 is, for example, a cyan (C) filter area, the second filter area 242 is, for example, a yellow (Y) filter area, and the third filter area 243 is, for example, a green (G) filter area. In R image and B image obtained by using the filter 21B, a blur function can be evenly controlled. Note that the first filter area 241 may be a magenta (M) filter area, the second filter area 242 may be a yellow (Y) filter area, and the third filter area 243 may be a red (R) filter area. Furthermore, the first filter area 241 may be a cyan (C) filter area, the second filter area 242 may be a magenta (M) filter area, and the third filter area 243 may be a blue (B) filter area.

The filter 21C of FIG. 4(C) includes four filter areas 251, 252, 253, and 254. The first filter area 251, the second filter area 252, and the third filter area 253 each have a square shape, and a remaining area on the filter 21C excluding the filter areas 251, 252, and 253 is the fourth filter area 254. The first filter area 251 is, for example, a red (R) filter area. The second filter area 252 is, for example, a green (G) filter area. The third filter area 253 is, for example, a blue (B) filter area. Furthermore, the fourth filter area 254 is, for example, a black (shield) filter area.

In the following description, for clear understanding of the embodiment, a case where the first filter area 211 is a yellow (Y) filter area and the second filter area 212 is a cyan (C) filter area in the filter 21 of FIG. 3 will be mainly described.

With the above-described filter 21 provided with the aperture part of the camera, a color aperture having a two-split aperture structure of two colors is achieved. Based on light rays passing the color aperture, the image sensor 23 generates an image. The filter 21 may be disposed between the lens 22 and the image sensor 23 on the path of light rays incident on the image sensor 23. Furthermore, if lenses 22 are provided, the filter 21 may be disposed between two lenses 22.

Light rays of wavelength band corresponding to the imaging element receiving green (G) light rays in the image sensor 23 pass both the first filter area 211 of yellow and the second filter area 212 of cyan. Light rays of wavelength band corresponding to the imaging element receiving red (R) light rays in the image sensor 23 pass the first filter area 211 of yellow and do not pass the second filter area 212 of cyan. Light rays of wavelength band corresponding to the imaging element receiving blue (B) light in the image sensor 23 pass the second filter area 212 of cyan and do not pass the first filter area 211 of yellow.

Note that, a state where light rays of a certain wavelength band passes a filter or a filter area means that the filter or the filter area passes the light rays of the certain wavelength band with high transmittance and hardly attenuates the light rays of the certain wavelength (that is, decrease of light intensity). Furthermore, a state where light rays of a certain wavelength band does not pass a filter or a filter area means that the light ray is blocked by the filter or the filter area, and for example, the filter or the filter area passes the light rays of the certain wavelength band with low transmittance and substantially attenuates the light rays of the certain wavelength band. For example, the filter or the filter area absorbs light rays of a certain wavelength band to attenuate the light rays.

FIG. 5 shows an example of transmittance characteristics of the first filter area 211 and the second filter area 212. The transmittance to the light rays of a wavelength longer than 700 nm in a visible light wavelength band is not illustrated, but the transmittance is near to the case of 700 nm. In the transmittance characteristic 215 of the first filter area 211 of yellow in FIG. 5, the light rays corresponding to the R image having a wavelength band of about 620 nm to 750 nm and the G image having a wavelength band of about 495 nm to 570 nm are transmitted at a high transmittance, and most of the light rays corresponding to the B image of a wavelength band of about 450 nm to 495 nm are not transmitted. In addition, in a transmittance characteristic 216 of the second filter area 212 of cyan, the light rays of the wavelength band corresponding to the B and G images are transmitted at a high transmittance, and most of the light rays of the wavelength band corresponding to the R image are not transmitted.

Therefore, the light rays of the wavelength band corresponding to the R image transmit only the first filter area 211 of yellow, and the light rays of the wavelength band corresponding to the B image transmit only the second filter area 212 of cyan.

The blur shapes on the R and B image change depending on a distance (or a depth) d to the object. In addition, each of the filter areas 211 and 212 has a point-asymmetric shape with respect to the optical center 213. Therefore, the directions of blur deviation on the R and B images are inverted according to whether the object is on the near side or on the deep side from a focused position when viewed from an image capture point. The focused position is a point away from the image capture point by a focus distance df, and is a focused position at which the blur does not occur on the image.

Figure 6:
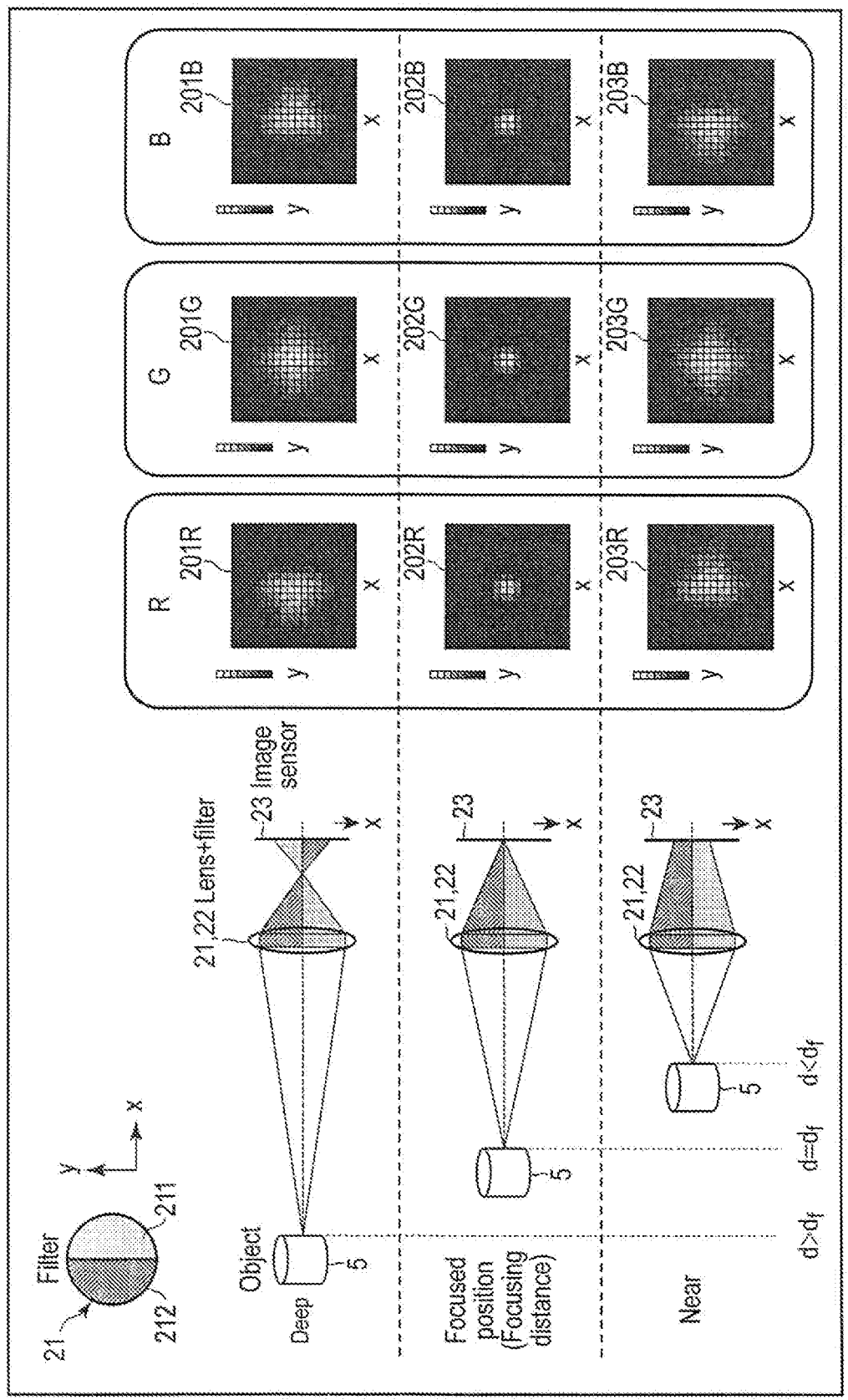
FIG. 6 shows a change in light and a blur shape by a color aperture in which the filter of FIG. 3 is disposed.

The description will be given about a change of the light rays and the blur shape due to the color-filtered aperture where the filter 21 is disposed, with reference to FIG. 6.

When an object 5 is on the deep side from the focus distance df (focused position) (d>df), blur occurs in an image captured by the image sensor 23. A blur function indicating a shape of blur on the image is different among the R image, the G image, and the B image. That is, a blur function 201R of the R image indicates the blur shape deviated to the left side, a blur function 201G of the G image indicates the blur shape without deviation, and a blur function 201B of the B image indicates the blur shape deviated to the right side.

When the object 5 is at the focus distance df (d=df), blur almost does not occur in an image captured by the image sensor 23. A blur function indicating a shape of blur on the image is almost the same among the R image, the G image, and the B image. That is, a blur function 202R of the R image, a blur function 202G of the G image, and a blur function 202B of the B image show blur shapes without deviation.

When the object 5 is on the near side from the focus distance df (d<df), blur occurs in an image captured by the image sensor 23. A blur function indicating a shape of blur on the image is different among the R image, the G image, and the B image. That is, a blur function 203R of the R image indicates the blur shape deviated to the right side, a blur function 203G of the G image shows the blur shape without deviation, and a blur function 203B of the B image shows the blur shape deviated to the left side.

As can be understood from the above, when the object 5 is on the deep side or the near side from the focus distance df, the blur functions 201R and 203R of R image based on light rays passing through the first filter area 211 of yellow are asymmetry and the blur functions 201B and 203B of B image based on light rays passing through the second filter area 212 of cyan are asymmetry. The blur functions 201R and 203R of R image are different from the blur functions 201B and 203B of B image, respectively.

FIG. 7 illustrates a method of calculating (estimating) a distance to the object 15 using blur on an image. In the example illustrated in FIG. 7, the first filter area 211 of yellow and the second filter area 212 of cyan constitute the filter 21. Therefore, the light rays of the wavelength band corresponding to the R image pass through a portion 51R corresponding to the first filter area 211, the light rays of the wavelength band corresponding to the G image pass through a portion 51G corresponding to the first filter area 211 and the second filter area 212, and the light rays of the wavelength band corresponding to the B image pass through a portion 51B corresponding to the second filter area 212.

When blur occurs on an image captured using the filter 21, a different shape of blur occurs on the R image, the G image, and the B image, respectively. As illustrated in FIG. 7, a blur function 52G of the G image indicates a point-symmetric shape of blur. A blur function 52R of the R image and a blur function 52B of the B image indicate a point-asymmetric shape of blur, and are different in the deviation of blur.

Blur correction filters 53 and 54 configured to correct the point-asymmetric blur on the R image and the B image into point-symmetric blur are applied to the blur function 52R of the R image and the blur function 52B of the B image. Then, a determination is made as to whether the blur functions 52R and 52B to which the blur correction filters 53 and 54 are applied match with the blur function 52G of the G image. A plurality of blur correction filters corresponding to a plurality of distances to an object is prepared as the blur correction filters 53 and 54. When a blur function 52R to which one of the blur correction filters 53 is applied or a blur function 52B to which one of the blur correction filter 54 is applied matches with the blur function 52G of the G image, the distance corresponding to the blur correction filter 53 or 54 is determined as the distance to the captured object 5.

Determining whether a blur function matches with another blur function can employ a correlation between the R image or B image to which the blur correction filter is applied and the G image. Therefore, for example, searching a blur correction filter, for which a correlation between the R image or B image to which the blur correction filter is applied and the G image is higher, from among the blur correction filters achieves estimating a distance to the object captured in each pixel on the image.

As a correlation value indicative of a correlation between the R image or B image to which the blur correction filter is applied and the G image, for example, normalized cross-correlation (NCC), zero-mean normalized cross-correlation (ZNCC), or color alignment measure may be used.

Furthermore, determining whether a blur function 55R or 55B to which one of the blur correction filters 53 or 54 is applied matches the blur function 52G of G image may employ a differentiation degree between the R image or B image to which the blur correction filter is applied and the G image. Searching a blur correction filter, for which the differentiation degree is lower, from among the blur correction filters achieves calculating a distance to the object. As the differentiation degree, for example, sum of squared difference (SSD) or sum of absolute difference (SAD) may be used.

Note that, while a distance is calculated in the above example, an index of distance or an index of blur on an image (pixel) may be calculated instead. To a distance or an index to be calculated, a reliability degree indicative of validity of the distance or the index may be appended based on the above-described correlation value or the differentiation degree. For example, when the correlation value is high or the differentiation degree is low, a high reliability degree is appended to the calculated distance or index. On the other hand, for example, when the correlation value is low or the differentiation degree is high, a low reliability degree is appended to the calculated distance or index. The reliability degree may be appended to each pixel in an image or may be appended to the image. Furthermore, reliability degrees may be appended to pixel groups each including several pixels in an image, respectively. If a reliability degree is appended to an image, one reliability degree may be set to a down-sampled image. Or, the reliability degree to an image may be set based on reliability degrees given to representative pixels in the image. The set reliability degree is an average of the reliability degrees of the representative pixels. Furthermore, by using, for example, all the correlation values (or differentiation degrees) obtained when distances are calculated (determined) with respect to pixels on the image, the reliability degree may be determined based on the maximum value or the minimum value of the correlation values (or differentiation degrees).

Figure 8:
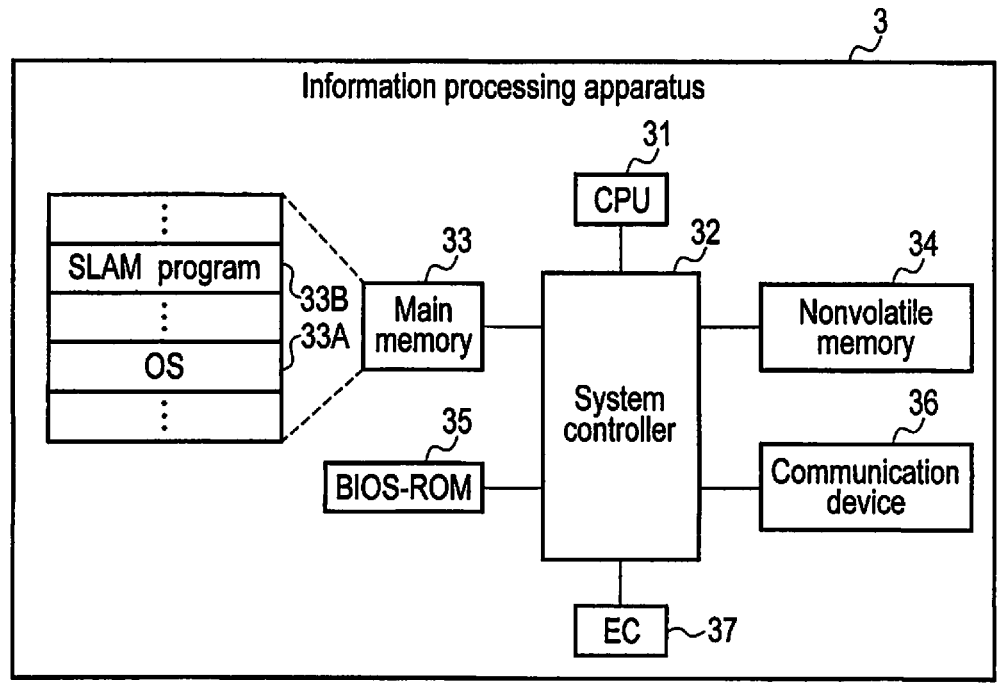
FIG. 8 is an exemplary block diagram showing a system configuration of an information processing apparatus used in the estimation system of the embodiment.

FIG. 8 shows a system configuration of the information processing apparatus 3. The information processing apparatus 3 includes a function of the estimation unit 13 which determines a position, a posture, and a map of the image capture device 2 (imaging unit 11) by using the image and distance-related data output from the image capture device 2 (processing unit 12).

The information processing apparatus 3 includes, for example, a CPU 31, a system controller 32, a main memory 33, a nonvolatile memory 34, a BIOS-ROM 35, a communication device 36, and an embedded controller (EC) 37.

The CPU 31 is a processor configured to control operations of various components in the information processing apparatus 3. The CPU 31 executes various programs loaded from the nonvolatile memory 34 which is a storage device, to the main memory 33. These programs include an operating system (OS) 33A and various application programs. The application programs include a SLAM program 33B. The SLAM program 33B includes instructions to estimate a position, a posture, and a map of the imaging unit 11.

Furthermore, the CPU 31 executes a basic input/output system (BIOS) stored in the BIOS-ROM 35. The BIOS is a program for hardware control.

The system controller 32 is a device connecting a local bus of the CPU 31 to various components. The system controller 32 includes a memory controller for access control of the main memory 33.

The communication device 36 is a device configured to execute wired or wireless communication. The communication device 36 includes a transmitter configured to transmit signals and a receiver configured to receive signals. The EC 37 is a one chip microcomputer including an embedded controller for power control. The EC 37 has a function to power on or off the information processing apparatus 3 according to a power button operation by a user.

Figure 9:
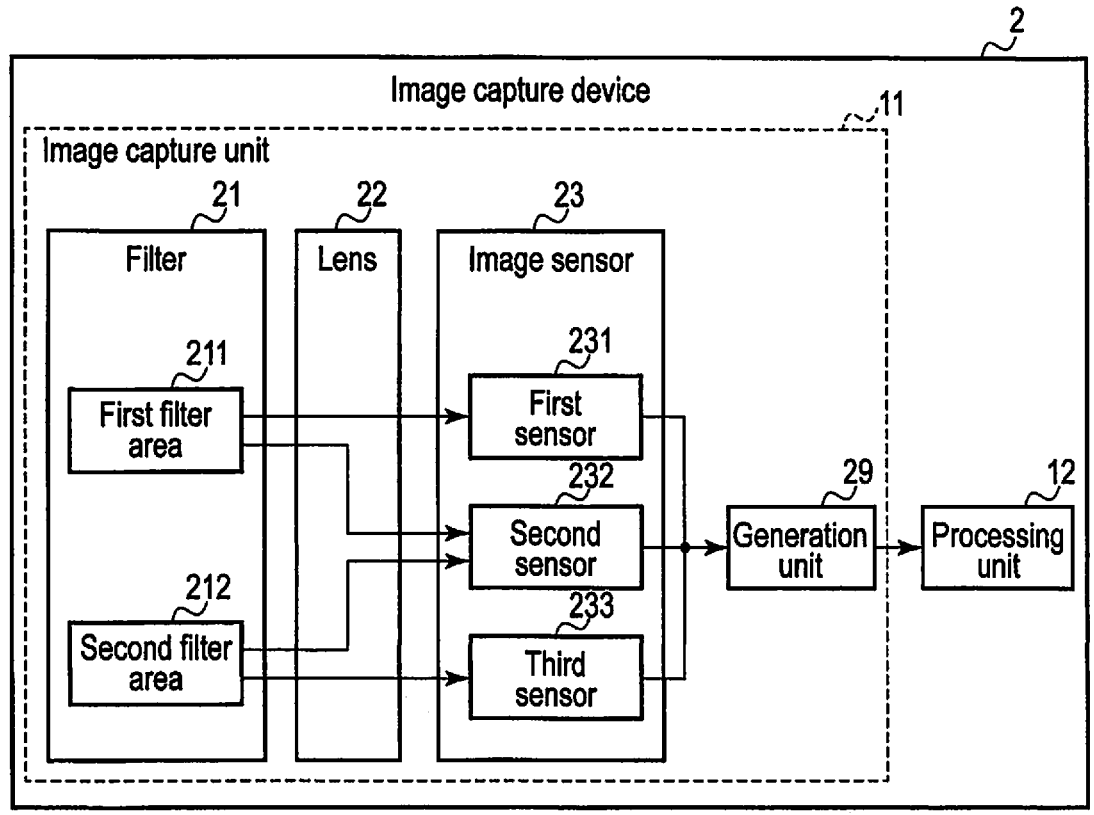
FIG. 9 is an exemplary block diagram showing a functional configuration of the image capture device of FIG. 2.

With reference to FIGS. 9 and 10, the functional configuration of the image capture device 2 and the information processing apparatus 3 will be explained. The configuration described below is an example, and part of the configuration of the image capture device 2 may be provided with the information processing apparatus 3, or part of the configuration of the information processing apparatus 3 may be provided with the image capture device 2.

FIG. 9 shows an example of the functional configuration of the image capture device 2. As described above, the image capture device 2 includes the filter 21, the lens 22, and image sensor 23. Each of arrows from the filter 21 to the image sensor 23 indicates a path of light rays. The filter 21 includes the first filter area 211 and the second filter area 212. In this example, the first filter area 211 is a yellow filter area and the second filter area 212 is a cyan filter area. The image sensor 23 includes a first sensor 231, a second sensor 232, and a third sensor 233. The first sensor 231 includes, for example, imaging elements each receiving red (R) light rays. The second sensor 232 includes, for example, imaging elements receiving green (G) light rays. The third sensor 233 includes, for example, imaging elements receiving blur (B) light rays. The image sensor 23 generates electric signals by subjecting a photoelectrical conversion to the received light rays.

The image capture device 2 further includes a generation unit 29 and the processing unit 12. An arrow from the image sensor 23 (sensor 231, 232, and 233) to the generation unit 29 shows a path of electric signals. An arrow from the generation unit 29 to the processing unit 12 shows a path of data. The functional configuration in the image capture device 2 including the generation unit 29 and the processing unit 12 may be realized as hardware (circuit), as software (program) executed by the CPU 24, or as a combination of software and hardware.

The generation unit 29 generates (outputs) one or more captured images by using electric signals generated by the image sensor 23. The one or more captured images may be an image including R, G, and B components, or may be three images of R, G, and B images. The captured image is encoded data in which distance information is encoded by the filter 21. Specifically, in the captured image, since distance information is encoded, blur does not occur in pixels distance of which to the object is a focused distance and blur occurs in pixels distance of which to the object is not a focused distance. If an image including R, G, and B components is generated, blur in the image of a first color component is represented by a point-asymmetric blur function, and blur in the image of a second color component is represented by a point-symmetric blur function. The first color component is, for example, R component or B component, and the second color component is, for example, G component.

The processing unit 12 processes the captured image to generate distance-related data. The processing unit 12 has, as described above with reference to FIGS. 6 and 7, a function to calculate data relating to a distance to an object captured in each of the pixels based on blur on the captured image. The distance-related data may be a distance itself, an index relating to a distance, or an index relating to blur. The index relating to distance or blur can be converted into a distance using a specific lookup table (LUT) relating to the index.

Furthermore, the processing unit 12 may append a reliability degree indicative of validity of the calculated distance and index to the distance and index. In that case, the distance-related data includes the calculated distance or index and the reliability degree indicative of validity of the distance or index.

The processing unit 12 transmits (outputs) the image and distance-related data to the information processing apparatus 3 through the communication device 28. If the information processing apparatus 3 includes the processing unit 12, the captured image may be transmitted to the information processing apparatus 3 instead of the captured image and distance-related data. In that case, the generation unit 29 transmits the captured image to the information processing apparatus 3 through the communication device 28.

Note that the generation unit 29 may generate multiple captured images obtained through successive image capture. The captured images are obtained by a single optical system. Each image includes a first color component image (for example, red and/or blue component image) having an asymmetric blur function. Each image may further include a second color component image (for example, green component image) having a symmetric blur function. The captures image is sequentially output to the processing unit 12. In the following description, each captured image may be referred to as a frame.

FIG. 10 shows a functional configuration of the SLAM program 33B executed by the information processing apparatus 3. The SLAM program 33B includes, for example, the estimation unit 13. That is, the CPU 31 executes instructions in the SLAM program 33B to achieve the function of the estimation unit 13. To the SLAM program 33B, for example, an image and distance-related data obtained by the imaging unit 11 and the processing unit 12 of the image capture device 2 are input. The estimation unit 13 of FIG. 10 estimates, for example, a self-position, a self-posture, and a map.

The estimation unit 13 receives the image and the distance-related data from the processing unit 12. By using the image and distance data, the estimation unit 13 estimates a position and a posture of the image capture device 2 (imaging unit 11) and a map of the periphery of the image capture device 2. The distance-related data may include a reliability degree. The estimation unit 13 includes, for example, a feature extraction module 131, a key frame determination module 132, a distance acquisition module 133, a feature tracking module 134, a corresponding point determination module 135, a position/posture estimation module 136, a map estimation module 137, and a work memory 65. The estimation unit 13 may further include an optimization module 138.

The feature extraction module 131 extracts features from an image. The feature extraction module 131 uses a local feature amount on the image to detect features such as edges and corners on the image. Multiple features may be detected from one image. Furthermore, as the feature amount used for the extraction of the features, ORB, BRIEF, FAST, AKAZE, and SIFT may be used. Note that the feature extraction module 131 may extract features in the image in consideration of distance (distance-related data) corresponding each pixel on the image. The feature extraction module 131 extracts, for example, a first pixel in the image as a feature when a difference between a distance corresponding to the first pixel and a distance corresponding to a second pixel adjacent to the first pixel is great.

The distance acquisition module 133 acquires distances that correspond to the extracted features, respectively, from the distance-related data and associates the features with the distances, respectively. For example, if the distance-related data is a distance (depth) image, the distance acquisition module 133 acquires a distance corresponding to the pixel as each feature and associates the feature (pixel) with the acquired distance. Furthermore, if the distance data is indexes relating to blur, the distance acquisition module 133 acquires the index relating to blur corresponding to the pixel as each feature and associates the feature (pixel) with the acquired index relating to blur.

Note that the distance acquisition module 133 may extract features in consideration of a reliability degree of the distance-related data. The distance acquisition module 133 may exclude, for example, a feature reliability degree of which is less than a threshold from the features, or may not associate such a feature with the distance-related data. This is because accuracy of the estimation of the self-position and posture and the map is deteriorated by associating the feature with the distance-related data with a low reliability degree. Furthermore, the accuracy of the estimation of the self-position and posture and the map is improved by selecting features associated with distances (distance-related data) with a high reliability degree. Note that the threshold may be changed dynamically.

The key frame determination module 132 determines whether a frame is suitable for a key frame used for the estimation of self-position or the like based on a specific condition. When determining that the frame is suitable for a key frame, the key frame determination module 132 stores key frame-related data in, for example, the work memory 65 or the like. The work memory 65 stores frame-related data for at least two key frames (a first key frame 651 and a second key frame 652). Specifically, the key frame determination module 132 stores the frame-related data in the work memory 65 when the number of features extracted from an image by the feature extraction module 131 is equal to or greater than a first threshold, and in the features, the number of features with which distance-related data is associated by the distance acquisition module 133 is equal to or greater than a second threshold. The frame-related data includes a key frame (captured image). The frame-related data further includes, for example, features and distance-related data associated with each other. The frame data unsuitable for the key frame will be discarded, and a key frame is further searched from subsequent frame data.

Note that the distance acquisition module 133 may perform a process of associating the features with the distance-related data when the number of the features extracted from an image by the key frame determination module 132 is equal to or greater than the first threshold. Then, the key frame determination module 132 determines whether the number of features with which the distance-related data are associated is equal to or greater than the second threshold.

When the data of two key frames 651 and 652 are stored in the work memory 65, the feature tracking module 134 associates a feature of the first key frame 651 with a feature of the second key frame 652. The feature tracking module 134 detects a feature of the second key frame 652 that corresponds to a feature of the first key frame 651. Specifically, the estimation unit 13 calculates a similarity (or dissimilarity) between a feature of the first key frame 651 and a feature of the second key frame 652, and for example, if the similarity is equal to or greater than a threshold, determines that the features correspond to each other. Furthermore, if the second key frame 652 does not have a feature similarity of which with a feature of the first key frame 651 is equal to or greater than a threshold, the estimation unit 13 determines that the second key frame 652 does not have a feature corresponding to the feature of the first key frame 651. In such an associating process between features, distance-related data associated with each feature may be considered. In the following description, two features associated with each other may be referred to as a corresponding point.

The corresponding point determination module 135 determines whether the acquired corresponding points are suitable for the estimation of the self-position and posture and the map based on a specific condition. The corresponding point determination module 135 determines that the acquired corresponding points are suitable for the estimation if the number of the corresponding points is equal to or greater than a third threshold, and a displacement between features constituting each of the corresponding points is equal to or greater than a fourth threshold. Note that, if the number of the corresponding features is less than the third threshold or if the displacement between features constituting each of the corresponding points is less than the fourth threshold, the corresponding point determination module 135 determines that the acquired corresponding points are unsuitable for the estimation, and instruct the feature extraction module 131, the distance acquisition module 133, and the key frame determination module 132 to search a new key frame. Through the search of new key frame, one of the key frames 651 and 652 stored in the work memory 65 may be replaced with a new key frame, or both of the key frames 651 and 652 may be replaced with new key frames.

By using the corresponding points determined to be suitable for the estimation, the position/posture estimation module 136 estimates the self-position and posture (for example, a position and a posture of the imaging unit 11). The self-position is, for example, indicated by three dimensional coordinates in an arbitrary local coordinate system. The self-position may be indicated by three dimensional coordinates in a world coordinate system or by latitude and longitude. The self-posture may be indicated by, for example, yaw, roll, and pitch, or by quaternion.

Specifically, the position/posture estimation module 136 performs, for example, two-view structure from motion (two-view SfM) using the corresponding points in order to estimate a movement of the imaging unit 11 between the first key frame 651 and the second key frame 652. Specifically, the position/posture estimation module 136 estimates a movement of the imaging unit 11 (camera movement) from a first position and posture at the time when the captured image corresponding to the first key frame 651 is taken to a second position and posture at the time when the captured image corresponding to the second key frame 652 is taken, and based on the estimated movement, estimates the first position and posture and the second position and posture relatively. The first position and the posture at the first position and the second position and the posture at the second position are estimated on, for example, a real scale. In the estimation, a distance calculated by the processing unit 12 with respect to the first key frame 651 and a distance calculated by the processing unit 12 with respect to the second key frame 652 are used. Specifically, at least one of a distance to the object calculated from the first key frame 651 and a distance to the object calculated from the second key frame 652 may be used in the estimation. The movement of the imaging unit 11 or of the object is estimated from a relative relationship between the self-position and the object at the time when the first key frame 651 is captured and a relative relationship between the self-position and the object at the time when the second key frame 651 is captured in order to estimate the self-position, self-posture, and map.

The position/posture estimation module 136 outputs at least data of the first and second positions. The position/posture estimation module 136 may further output, for example, data of the posture at the first position and the posture at the second position. The position/posture estimation module 136 may output, for example, data of the first position, the second position, and the posture at each of the first and second positions.

The map estimation module 137 estimates a map by using the corresponding points determined to be suitable for the estimation. The map estimation module 137 estimates three dimensional coordinates of each corresponding point (feature point) in the above local coordinate system. The map estimation module 137 estimates a first map of an area including the position of the imaging unit 11 based on an actual distance. The map estimation module 137 calculates the three dimensional coordinates of each corresponding point on a real scale based on, for example, triangulation techniques using the first position and posture and the second position and posture estimated with respect to the imaging unit 11. The map estimation module 137 can prepare a three dimensional map composed of feature points on the object based on the three dimensional coordinates of the estimated corresponding points. The map estimation module 137 may output, for example, data of estimated map.

Furthermore, the optimization module 138 may perform a process to optimize the estimated three dimensional coordinates of the corresponding points and the self-position and posture. In this process, bundle adjustment is used, for example. In bundle adjustment, a difference (re-projection difference) between coordinates of a feature on the image and projection coordinates in which estimated three dimensional coordinates of the feature are re-projected on the image is calculated for each feature, and the sum of the re-projection differences is minimized. Thus, the three dimensional coordinates of each feature, and the self-position and posture are optimized. The optimization may not be performed each time when three dimensional coordinates of corresponding points are calculated. For example, the optimization may be performed by minimizing a difference between projection coordinates in which three dimensional coordinates obtained for a feature on each of three or more images (key frames) are re-projected on the image and coordinates of the feature on the image. Furthermore, the optimization process may be performed in multithread using three dimensional coordinates calculated in the past apart from a thread in which a process to calculate the three dimensional coordinates is currently performed. The optimization module 138 outputs, for example, an optimized self-position. The optimization module 138 may further output at least one of an optimized self-posture and an optimized map.

Note that the position, posture, and map of the imaging unit 11 may be estimated on a relative scale, and the three dimensional coordinates of the corresponding point (feature) may be estimated on a relative scale. In that case, the position/posture estimation module 136 and the map estimation module 137 estimate (convert) the position of the imaging unit 11 and the three dimensional coordinates of the corresponding point estimated on the relative scale based on the real scale using the distance-related data.

As described above, the estimation system 1 can easily estimate, by using a captured image in which information of a distance between the imaging unit 11 and an object is encoded, a position and a posture of the imaging unit 11 and a map of a scene included in the captured image based on a real scale. Note that, in the estimation system 1, the information processing apparatus 3 may be disposed to be distant from the image capture device 2, and the information processing apparatus 3 and the image capture device 2 may be configured to mutually transfer the data through a network. For example, the image capture device 2 may be disposed in a movable body such as a robot or an automobile and the information processing apparatus 3 may be realized as a server computer which can communicate with the image capture device 2 through a network.

Furthermore, in the above-described example, the estimation unit 13 uses the image and distance-related data to execute a process (SLAM); however, the estimation unit 13 may use distance-related data alone to execute the SLAM process. For example, if the distance-related data is a distance (depth) image, the feature extraction module 131 extracts, based on the distance data of each pixel, features corresponding to edges or the like from the distance image. Each feature includes distance data as being extracted from the distance image. The key frame determination module 132, the feature tracking module 134, the corresponding point determination module 135, the position/posture estimation module 136, the map estimation module 137, and the optimization module 138 estimate the self-position and posture and the map by using the extracted features and distance data of each feature as in the method described above. Note that, in that case, an amount of each feature is based on distance.

For example, feature point extraction based on edges or the like may be difficult with distance data obtained from, for example, LiDAR (light detection and ranging or laser imaging detection and ranging). If any feature cannot be extracted from the distance data, the self-position and map cannot be estimated by SLAM, and if extracted features are few, accuracy of the self-position and map estimated by SLAM becomes very poor.

In contrast, with distance data obtained using an encoding aperture, features corresponding to edges or the like can be efficiently extracted. Thus, the estimation of the self-position and map by SLAM can be easily achieved, and accuracy of the self-position and map estimated by SLAM becomes high.

With reference to the flowchart of FIG. 11, the procedure of a process executed by the estimation system 1 will be explained. In this process, data of distance between the imaging unit 11 and the object are used to estimate the self-position, self-posture, and map on a real scale.

First, the imaging unit 11 acquires image data relating to both an image and a distance by image capture (step S101). The acquired image data include, for example, a captured image in which the distance information is encoded. Note that the image data may include an image and distance-related data. The imaging unit 11 sends the acquired image data to the processing unit 12 (step S102). The image data is, for example, a captured image.

The processing unit 12 outputs conversion data obtained from the image data (step S103). The conversion data is distance-related data. Then, the processing unit 12 sends the output conversion data to the estimation unit 13 (step S104). The processing unit 12 may further transmit the captured image to the estimation unit 13. A reliability degree may be added to the distance-related data.

Then, the estimation unit 13 estimates, based on conversion data, at least one of the self-position, self-posture, and map on a real scale (step S105).

Such a process may be achieved as a SLAM process (for example, RGB-D SLAM). FIG. 12 shows a flowchart of the procedure of a SLAM process executed by the estimation system 1.

Firstly, the estimation unit 13 performs a key frame search process to search a key frame of real scale (step S201). The imaging unit 11 and the processing unit 12 acquire data of each frame in order. Specifically, as data of a frame, the imaging unit 11 acquires a captured image (encoded data) in which distance information is encoded, and the processing unit 12 acquires distance-related data from the captured image. The estimation unit 13 searches a key frame from captured images. Details of the key frame search process will be described later with reference to a flowchart of FIG. 13.

The estimation unit 13 saves the searched frame (captured image), image features, and distance-related data associated with each image feature to, for example, the work memory 65 as data relating to the first key frame 651 (step S202). That is, the data relating to the first key frame 651 include multiple sets of a feature and distance-related data.

Then, the estimation unit 13 performs a key frame search process to search a key frame of real scale from, for example, subsequent frames as in step S201 (step S203). The estimation unit 13 saves the searched frame, image features, and distance-related data associated with each image feature to, for example, the work memory 65 as data relating to the second key frame 652 (step S204). That is, the data relating to the second key frame 652 include multiple sets of a feature and distance-related data.

Then, the estimation unit 13 associates the features (feature tracking) between the first key frame 651 and the second key frame 652 (step S205). The estimation unit 13 detects a feature of the second key frame 652 corresponding to a feature of the first key frame 651. Note that two associated features may be referred to as a corresponding point.

The estimation unit 13 determines whether the number of corresponding points associated in step S205 is equal to or greater than a third threshold (step S206). If the number of corresponding points is less than the third threshold (NO in step S206), the process returns to step S203 and a new second key frame is searched. Alternatively, the process may return to step S201 to search both new first and second key frames.

If the number of corresponding points is equal to or greater than the third threshold (YES in step S206), the estimation unit 13 determines whether a displacement in the corresponding points is equal to or greater than a fourth threshold (step S207). The estimation unit 13 calculates a displacement between two features constituting each of the corresponding points, for example, and determines whether the sum of calculated displacements of the corresponding points is equal to or greater than the fourth threshold. If the displacement in the corresponding points is less than the fourth threshold (NO in step S207), the process returns to step S203 and a new second key frame is searched. Alternatively, the process may return to step S201 to search both new first and second key frames.

If the displacement in the corresponding points is equal to or greater than the fourth threshold (YES in step S207), the estimation unit 13 estimates the position and posture of the imaging unit 11 on a real scale (step S208). Then, the estimation unit 13 estimates three dimensional coordinates of each feature (each corresponding point) on a real scale (step S209).

Furthermore, the estimation unit 13 may perform a process to optimize the estimated three dimensional coordinates of each feature and the estimated position and posture of the imaging unit 11 (step S210).

One of step S208 and step S209 may be omitted. Furthermore, when step S208 is executed, at least one of the self-position and the self-posture is estimated.

Figure 13:
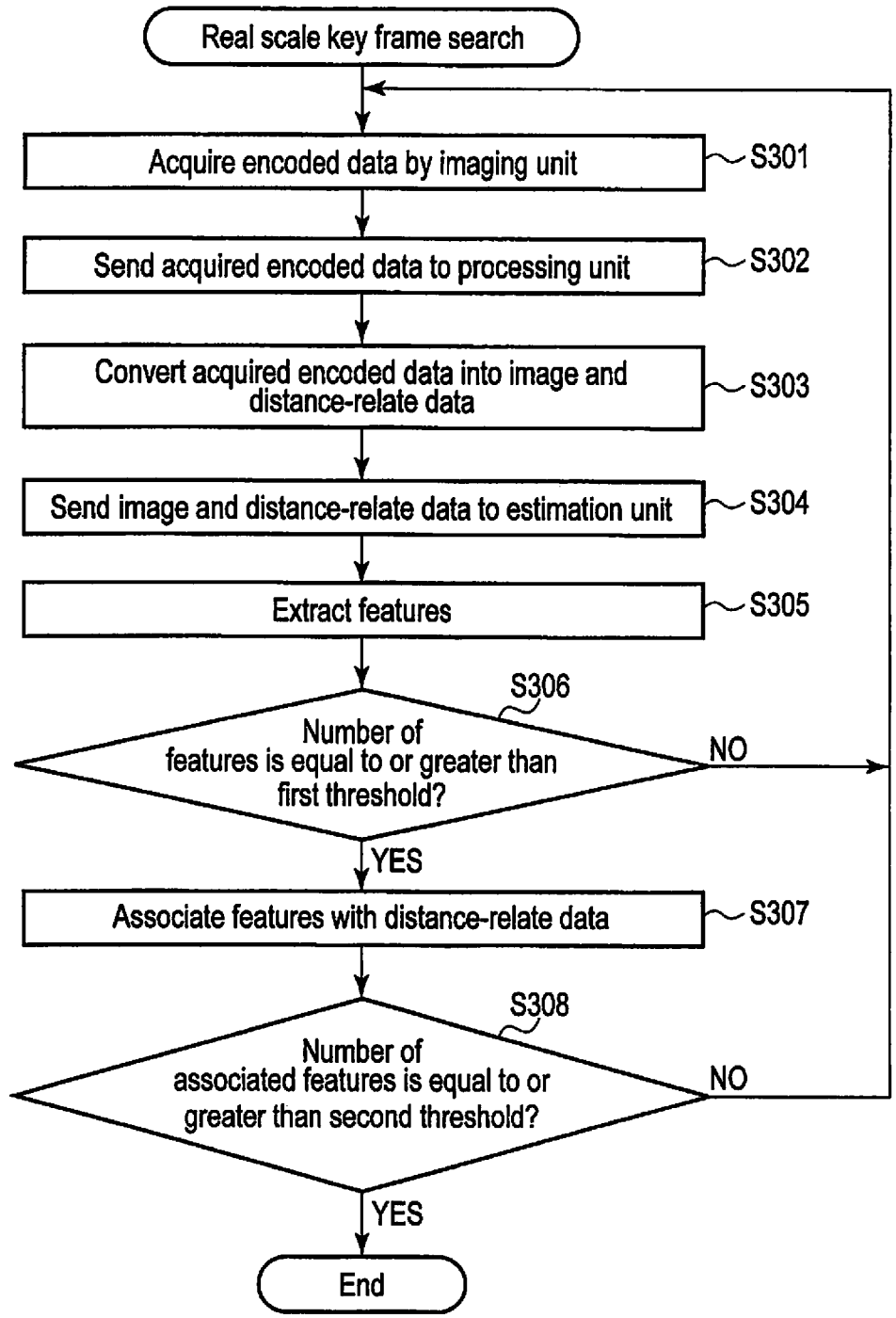
FIG. 13 is a flowchart of an example of the procedure of a process performed after acquisition of a captured image until a real scale key frame search process executed by the estimation system of the embodiment.

FIG. 13 shows a flowchart of the procedure of a process performed after acquisition of a captured image until a key frame search process. The key frame search process is performed as part of the above SLAM process (for example, the procedure of steps S201 and S203).

The imaging unit 11 initially acquires encoded data (for example, a captured image in which distance information is encoded) (step S301). Then, the imaging unit 11 sends the acquired encoded data to the processing unit 12 (step S302).

The processing unit 12 converts the encoded data into distance-related data (step S303), and sends the captured image and the distance-related data to the estimation unit 13 (step S304).

The estimation unit 13 extracts image features from the image (step S305). Then, the estimation unit 13 determines whether the number of the features extracted from the image is equal to or greater than the first threshold (step S306). The first threshold may be changed dynamically. If the number of features is less than the first threshold (NO in step S306), the encoded data acquired in step S301 is determined unsuitable for the estimation of the self-position and posture and the map. Thus, the process returns to step S301 and new encoded data is acquired by the imaging unit 11.

If the number of the extracted features is equal to or greater than the first threshold (YES in step S306), the estimation unit 13 associates each extracted feature with distance-related data (step S307). Then, the estimation unit 13 determines, of the features extracted from the image, whether the number of features associated with the distance-related data is equal to or greater than the second threshold (step S308). The second threshold may be changed dynamically. If the number of the associated features is less than the second threshold (NO in step S308), the encoded data acquired in step S301 is determined unsuitable for the estimation of the self-position and posture and the map. Thus, the process returns to step S301 and new encoded data is acquired.

If the number of the associated features is equal to or greater than the second threshold (YES in step S308), the image is determined to be a key frame, and the process ends. The key frame, the features, and distance-related data are stored in the work memory 65.

Through the above process, the key frame suitable for the estimation of the self-position and posture and the map can be acquired.

Figure 14:
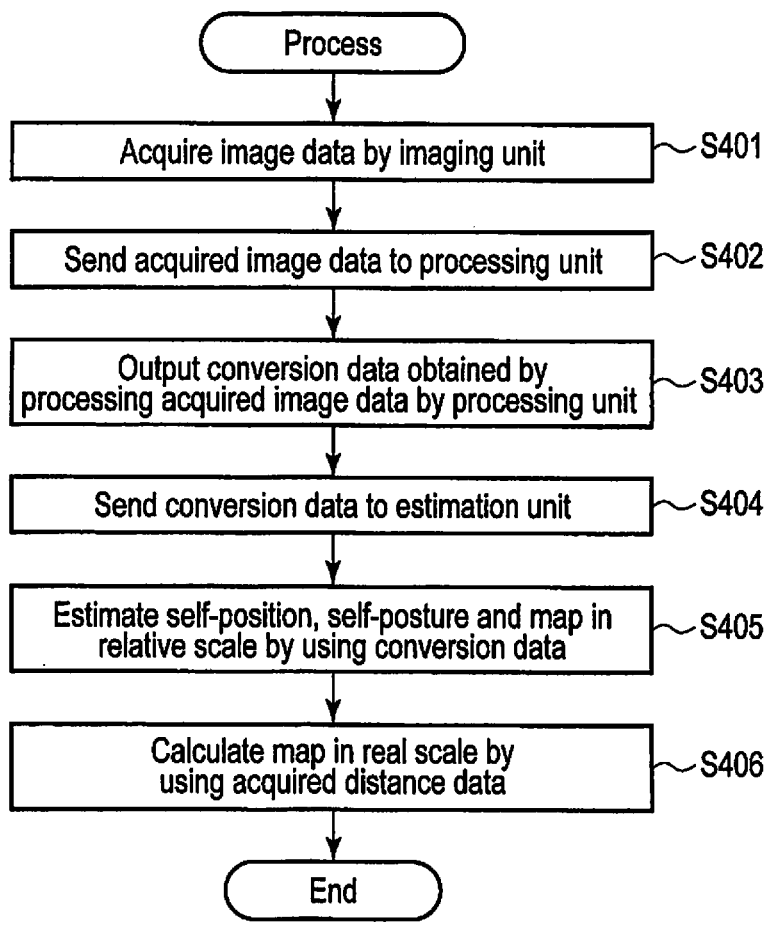
FIG. 14 is a flowchart of another example of a process executed by the estimation system of the embodiment.

Furthermore, FIG. 14 shows a flowchart of another procedure of a process executed by the estimation system 1. In the process of the flowchart of FIG. 11, the map and the position of the imaging unit 11 are estimated on a real scale while FIG. 14 shows an example of a process to estimate the map and the position of the imaging unit 11 on a relative scale and then convert the estimated map and the estimated position of the imaging unit 11 to them on a real scale.

Figure 11:
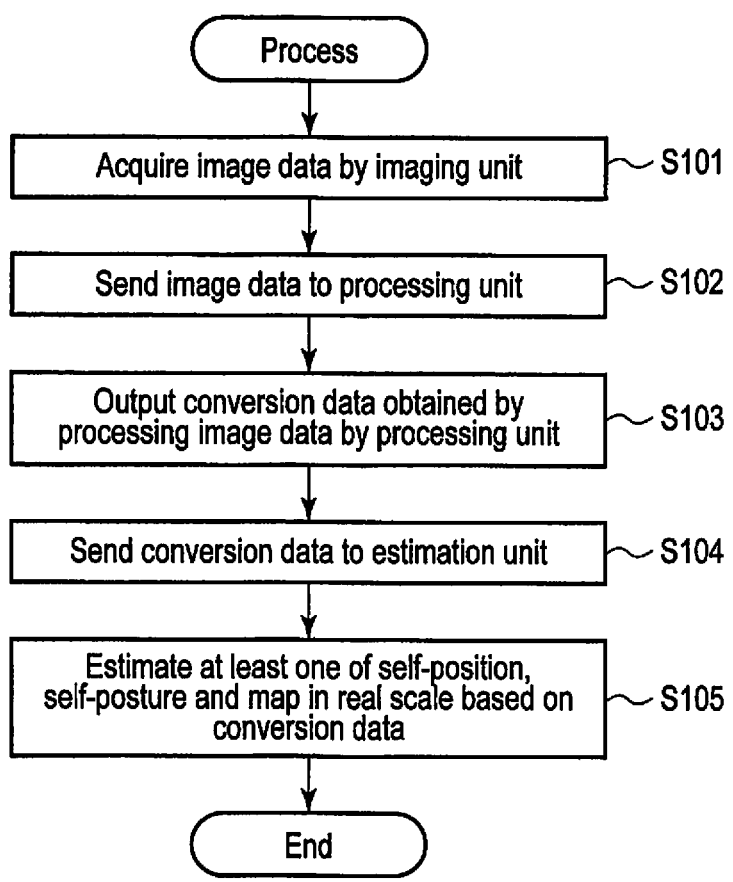
FIG. 11 is a flowchart of an example of the procedure of a process executed by the estimation system of the embodiment.

Steps S401 to S404 are the same as steps S101 to S104 in the flowchart of FIG. 11, respectively.

After steps S401 to S404, the estimation unit 13 estimates the self-position and posture and the map based on conversion data (for example, an image and distance data) (step S405). Then, the estimation unit 13 performs scaling (enlargement or reduction) of the estimated map by using the distance data for acquiring a map on a real scale (step S406). When the distance-related data indicates an actual distance between the imaging unit 11 and a point (feature) on the map, for example, the estimation unit 13 can acquire the map on a real scale by scaling a distance between the self-position and the point in the map indicated on the relative scale to the actual distance. The estimation unit 13 outputs data of the self-position and posture and the map on the real scale.

As described above, the estimation system 1 can easily estimate the self-position and posture and the map on the real scale. The estimation system 1 can output at least one of the self-position and posture and the map on the real scale.

Furthermore, for example, in a method of estimation of self-position and posture and a map using an image captured by a camera and a distance measured by a distance sensor, a process to synchronize the image and the distance is required. In the estimation system 1 of the present embodiment, an image and distance-related data or encoded data acquired at a time of capturing is used for the estimation, and thus, a process of synchronize the image and the distance is not required. Thus, a time required for this process can be omitted, and the position of the imaging unit 11 can easily be estimated.

Furthermore, for example, in a method of estimation of self-position and posture and a map using an image captured by a monocular camera and dictionary data indicative of shapes and the like of objects, the dictionary data is required preliminarily. If a camera does not capture an image including an object registered in the dictionary, the self-position and posture and the map cannot be estimated. In the estimation system 1 of the present embodiment, dictionary data is not necessary, and a workload of a user can be reduced.

Now, some variations including the estimation system 1 having the configuration described above will be explained.

Figure 15:
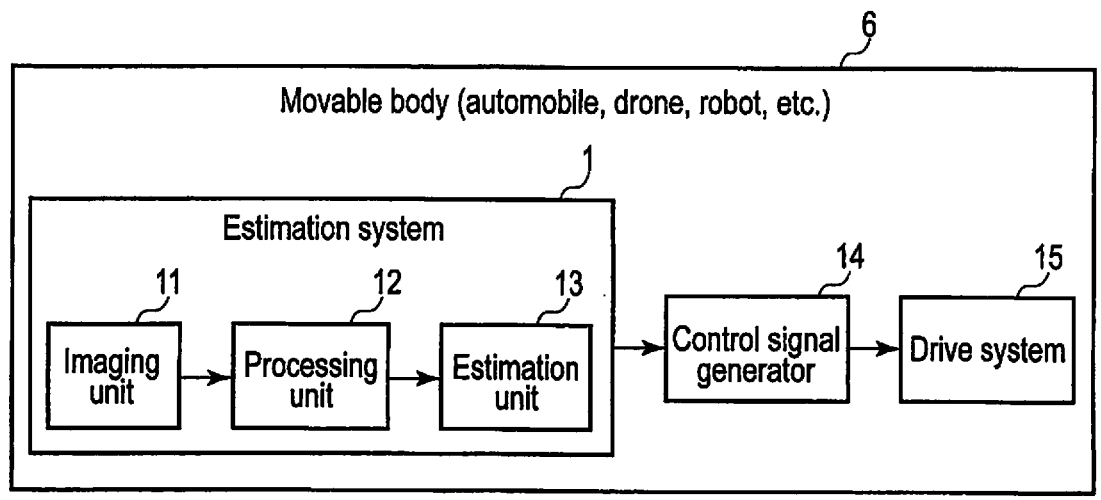
FIG. 15 is an exemplary block diagram of the configuration of a movable body including the estimation system of the embodiment.

FIG. 15 illustrates an exemplary functional configuration of a movable body 6 including the estimation system 1. The movable body 6 may be realized, for example, as a car having a self-driving function, an unmanned aerial vehicle, and an autonomous mobile robot. Examples of the unmanned, aerial vehicle include an airplane, a rotary wing aircraft, a glider, or an airship which a person cannot board. The unmanned aerial vehicle can fly by remote control or on autopilot, and examples thereof include a drone (multicopter), a radio control plane, and a helicopter for spraying agricultural chemicals. An example of the autonomous mobile robot includes a mobile robot such as an automated guided vehicle (AGV), a cleaning robot used for floor cleaning, and a communication robot that provides various kinds of information to visitors. In addition to these examples in which the robot itself moves, the movable body 6 may also be an industrial robot having a drive system for moving and rotating a part of the robot such as a robot arm.

As illustrated in FIG. 15, the movable body 6 includes, for example, the estimation system 1, a control signal generator 14, and a drive system 15. Among the components disposed in the estimation system 1, at least the imaging unit 11 is installed, for example, so as to capture an object in a traveling direction of the movable body 6 or a part thereof.

Figure 16:
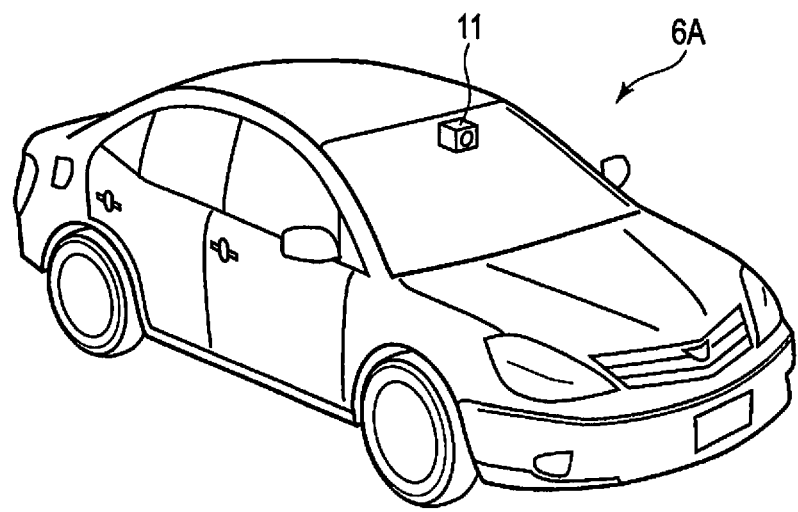
FIG. 16 is an exemplary perspective view of the exterior of an automobile including the estimation system of the embodiment.

In a case where the movable body 6 is a car 6A as illustrated in FIG. 16, the imaging unit 11 may be installed as the so-called front camera that captures an image in front of the movable body 9, or as the so-called rear camera that captures an image in back of the movable body 9 when backing. Naturally, both of those cameras may be installed. The imaging unit 11 may double the so-called drive recorder. In other words, the imaging unit 11 may be a video recorder.

FIG. 17 illustrates another example in a case where the movable body 6 is a drone 6B. The drone 6B includes a drone body 71 corresponding to the drive system 15 and four propeller units 721, 722, 723, and 724. Each of the propeller units 721, 722, 723, and 724 includes a propeller and a motor. Transmitting drive of the motor to the propeller rotates the propeller, and the drone 6B floats due to lifting force caused by the rotation. The imaging unit 11 (or the estimation system 1 including the imaging unit 11) is mounted on, for example, a lower part of the drone body 71.

FIG. 15 illustrates another example in a case where the movable body 6 is an autonomous mobile robot 6C. A power output unit 81 including a motor, wheels, and the like, corresponding to the drive system 15 is provided to a lower part of the mobile robot 6C. The power output unit 81 controls rotation frequency of the motor and orientations of the wheels. Transmitting drive of the motor to the wheels rotates the wheels in contact with a road surface or a floor surface. As the orientations of the wheels are controlled, the mobile robot 6C can move in any direction. The imaging unit 11 may be installed, for example, on the head of the humanoid mobile robot 6C so as to capture an image in front of the mobile robot 6C. It should be noted that the imaging unit 11 may be installed so as to capture an image in back of, or right/left side of the mobile robot 6C. Alternatively, the imaging unit 11 may be installed in plural so as to capture images in multiple directions. Furthermore, a small robot having less space for mounting a sensor and the like may be provided with at least the imaging unit 11 so as to estimate a self-position, a self-posture, and a map, thereby performing dead reckoning.

Figure 19:
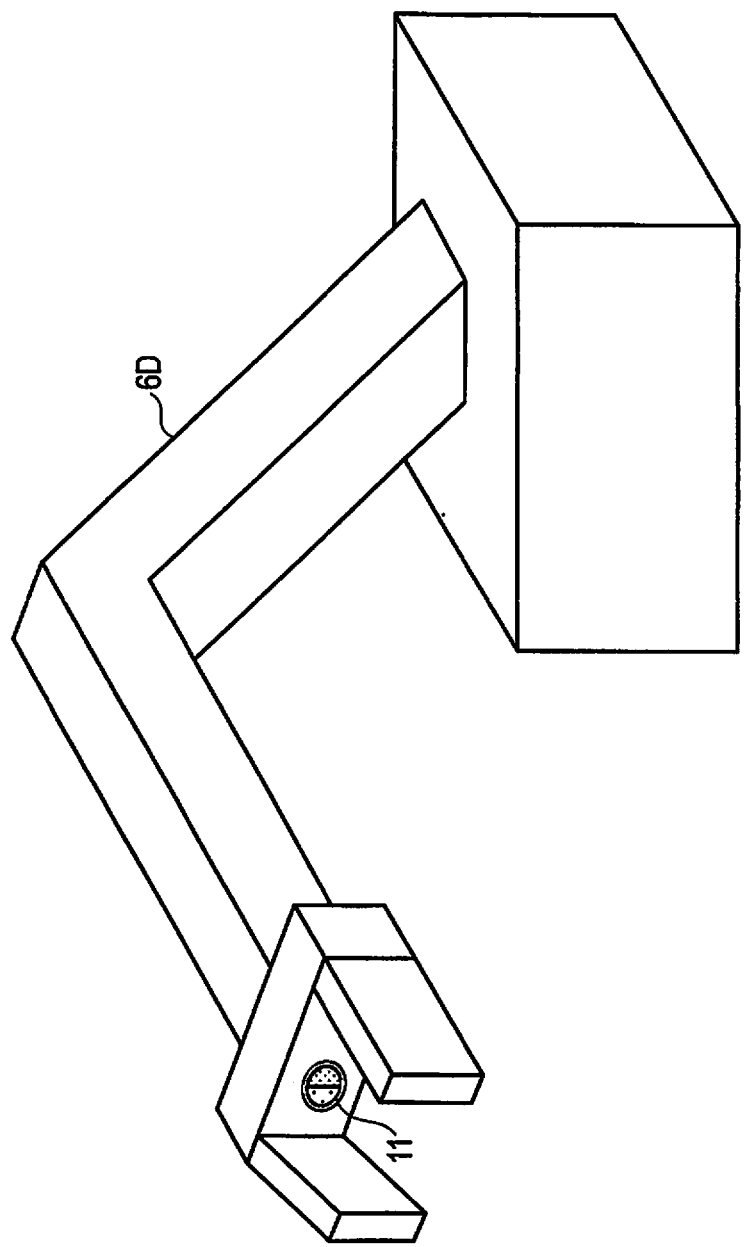
FIG. 19 is an exemplary perspective view of the exterior of a robot arm including the estimation system of the embodiment.

In a case of controlling movement and rotation of a part of the movable body 6, the imaging unit 11 may be installed at a leading end and the like of a robot arm 6D, as illustrated in FIG. 19, so as to capture an object held by the robot arm 6D. The estimation unit 13 estimates a three-dimensional shape of an object which is to be held and a location where the object is placed. Accordingly, the robot arm 6D can perform an accurate operation to hold the object.

The control signal generator 14 outputs a control signal to control the drive system 15 based on the self-position, the self-posture, and the map output from the estimation system 1. The drive system 15 drives the movable body 6 or a part of the movable body 6 by the control signal. The drive system 15 performs, for example, at least one of the following operations: operations to move, rotate, accelerate, or decelerate the movable body 6 or a part thereof, an operation to increase or decrease thrust (lifting force) of the movable body 6 or a part thereof, an operation to change a traveling direction, an operation, to switch between a normal operation mode and an automatic operation mode (collision avoidance mode), or an operation to activate a safety device such as an air bag. In a case where a distance from the self-position to the object is less than a threshold, the drive system 15 may perform, for example, at least one of the following operations: operations to move, rotate, accelerate, increase or decrease thrust (lifting force), an operation to change directions so as to face a direction in which the movable body 6 approaches an object, or an operation to switch from the automatic operation mode (collision avoidance mode) to the normal operation mode.

The drive system 15 of the car 6A includes, for example, a tire. The drive system 15 of the drone 6B includes, for example, propellers. The drive system 15 of the mobile robot 6C includes, for example, leg units. The drive system 15 of the robot arm 6D is, for example, a support unit that supports the leading end provided with the imaging unit 11.

The movable body 6 may further include a speaker and/or a display in which information relating to the self-position, self-posture, and map from the estimation unit 13 is input. The speaker and the display output sounds or images relating to the self-position, the self-posture, and the map. The speaker and the display are connected to the estimation system 1 through wire or wirelessly. The movable body 6 may also include a light emitting unit in which the information relating to the self-position, self-posture, and map from the estimation unit 13 is input. The light emitting unit is configured to, for example, turn on or off a light in accordance with the information relating to the self-position, self-posture, and map from the estimation unit 13.

It should be noted that the estimation unit 13 of the estimation system 1 may use an estimated location of the imaging unit 11 and a map created by a device other than the estimation system 1 and input to the estimation system 1 (for example, a map for car navigation) so as to estimate the location of the imaging unit 11 on the map. The movable body 6 may be provided with a GPS receiver (not illustrated) to receive GPS signals and to detect a location in a GPS coordinate system. The map for car navigation is, for example, a map used in a car navigation system provided to a car, and includes data that indicates objects such as roads, bridges, and buildings in the GPS coordinate system. The location obtained with the GPS receiver may include an error (for example, an error by several meters) depending on situations at the time of receiving the GPS signals. Therefore, not only the location obtained with the GPS receiver but also the location of the imaging unit 11 estimated by the estimation system 1 are used so that the self-position on the map can be estimated with higher accuracy. Even in a case where the location cannot be obtained with the GPS receiver due to poor reception of the GPS signals, once the self-position on the map is obtained, then, the estimation unit 13 can continuously estimate the self-position on the map, using the position of the imaging unit 11 continuously estimated by the estimation system 1. Accordingly, it is possible to move the movable body 6 to a target location.

The estimation unit 13 may also complement the map for car navigation, using three-dimensional coordinates of an estimated features (that is, three-dimensional coordinates of a captured object on pixels of an image). For example, the estimation unit 13 can repeatedly estimate three-dimensional coordinates of features from captured images continuously obtained while the car is traveling. Accordingly, three-dimensional coordinates of an object not included in the map for car navigation can be added to the map so that a more detailed map can be obtained. Based on the location of the imaging unit 11 on the complemented map, the control signal generator 14 and the drive system 15 can move the movable body 6 (a car, and the like) so as to avoid, for example, a collision.

As another example, in a case where the movable body 6 is a drone, when generating a map (a three-dimensional shape of an object), investigating a structure of a building or terrain, or checking cracks or breakage in an electric wire from the sky, the imaging unit 11 obtains an image of an object and determines whether a distance between a self-position and the object on the map is equal to or more than a threshold. Based on the determination result, the control signal generator 14 generates a control signal for controlling thrust of the drone so that the distance to the object to be inspected is kept constant. The thrust also includes lifting force. As the drive system 15 operates the drone based on this control signal, the drone can fly in parallel to the object to be inspected. In a case where the movable body 6 is a monitoring drone, a control signal for controlling thrust of the drone may be generated so that a distance to an object to be monitored is kept constant.

When the drone flies, the imaging unit 11 obtains an image shot in a direction toward the ground and determines whether a distance between a self-position and the ground is equal to or more than a threshold. Based on the determination result, the control signal generator 14 generates a control signal for controlling the thrust of the drone so that a height from the ground is set to a specified height. As the drive system 15 operates the drone based on this control signal, the drone can fly at the specified height. In a case where the movable body 6 is a drone for spraying agricultural chemicals, an agricultural chemical can be spread evenly as a height of the drone from the ground is kept constant.

In a case where the movable body 6 is a drone or a car, when drones fly in concert with each other or when cars drive in a row, the imaging unit 11 obtains images shot of surrounding drones or an image of a car in front of the movable body 6, and determines whether distances from a self-position to the surrounding drones or a distance to the foregoing car is equal to or more than a threshold. Based on the determination result, the control signal generator 14 generates a control signal for controlling thrust of the drone or a speed of the car so that the distances to the surrounding drones or the distance to the foregoing car is kept constant. As the drive system 15 operates the drone or the car based on this control signal, the drone can easily fly in concert with other drones or the car can easily drive in a row with other cars. In a case where the movable body 6 is a car, a threshold may be changed as the movable body 6 receives an instruction from a driver through a user interface so that the driver can set the threshold. Accordingly, the driver can drive the car while keeping his/her preferred inter-vehicular distance. Alternatively, in order to maintain a safe inter-vehicular distance to a foregoing car, a threshold may be changed in accordance with the speed of the car. The safe inter-vehicular distance varies depending on the speed of the car. The more the speed of the car increases, the longer the threshold is set. In the case where the movable body 6 is a car, a predetermined distance in a traveling direction is preferably set as a threshold, and the control signal generator 14 is preferably configured to automatically operate a brake or a safety device such as an air bag when an object appears in front of the threshold. In this case, the safety device such as an automatic brake or an air bag is provided to the drive system 15.

In such manners, according to this embodiment, it is possible to obtain a self-position and a map on the real scale with high accuracy, and by using the self-position and map on the real scale, it is possible to easily control operations of the movable body 6 of various types such as a car, a drone, and a robot.

Each of the various functions described in this embodiment may be realized by a circuit (processing circuit). An example of the processing circuit includes a programmed processor such as a central processing unit (CPU). This processor executes computer programs (instructions) stored in a memory so as to execute each of the described functions. The processor may be a microprocessor including an electrical circuit. Examples of the processing circuit include a digital signal processor (DSP), an application specific integrated circuit (ASIC), a microcontroller, a controller, and other electrical circuit components. Each of the components other than the CPU described in this embodiment may also be realized by the processing circuit.

Furthermore, the various procedures in this embodiment can be realized by computer programs. Therefore, as the computer programs are installed in a computer through a storage medium capable of reading the computer storing the computer programs, it is possible to achieve effects similar to those in this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimation system comprising:
    a monocular imaging unit comprising a camera and an encoding aperture, the monocular imaging unit being configured to acquire an image and first data relating to an actual distance to an object captured in the image, the image and the first data being synchronized; and
    processing circuitry configured to estimate a position of the imaging unit by:
        searching a first key frame of real scale in a work memory;
        determining second key frame of the real scale based on the image and the first data;
        determining corresponding points between features in the first key frame and features in the second key frame by calculating a similarity between the first key frame and the second key frame;
        in response to determining the corresponding points are above a first threshold, determining a difference between the corresponding points; and
        in response to determining the difference is above a second threshold, estimating the position of the imaging unit in the real scale.

2. The estimation system of claim 1, wherein:
    the monocular imaging unit is configured to acquire images of the object;
    determining the second key frame comprises detecting features from the images; and
    estimating the position of the imaging unit comprises:
        estimating the position of the imaging unit based on a relative scale by using the features; and estimating the position of the imaging unit based on an actual distance by using the estimated position of the imaging unit based on the relative scale and the first data.

3. The estimation system of claim 1, wherein:
the imaging unit is configured to acquire images of the object;
determining the second key frame comprises detecting features from the images; and
estimating the position of the imaging unit comprises:
estimating the position of the imaging unit based on a real scale by using the features and the first data corresponding to the features; and
estimating three dimensional coordinates corresponding to the features based on an actual distance.

4. The estimation system of claim 1, wherein:
the encoding aperture is located at an aperture part of the imaging unit, and
the aperture part comprises areas each having a point-asymmetric shape to an optical center.

5. An estimation system comprising:
a monocular imaging unit comprising a camera and an encoding aperture, the monocular imaging unit being configured to output encoded data obtained by capturing an object and first data relating to an actual distance of the object; and
processing circuitry configured to estimate a position of the monocular imaging unit based on the actual distance by:
searching a first key frame of real scale in a work memory;
determining second key frame of the real scale based on the image and the first data;
determining corresponding points between features in the first key frame and features in the second key frame by calculating a similarity between the first key frame and the second key frame;
in response to determining the corresponding points are above a first threshold, determining a difference between the corresponding points; and
in response to determining the difference is above a second threshold, estimating the position of the imaging unit in the real scale.

6. The estimation system of claim 5, wherein:
the imaging unit is configured to output the encoded data obtained by capturing an actual distance between the object and the imaging unit that is encoded, and
the processing circuitry is further configured to convert the encoded data into an image and first data relating to an actual distance; and
estimating the position of the imaging unit comprises estimating the position of the imaging unit based on an actual distance by using the image and the first data.

7. The estimation system of claim 6, wherein the imaging unit is configured to:
capture an image of the object; and
output the encoded data comprising the image.

8. The estimation system of claim 7, wherein:
the imaging unit is configured to:
capture images of the object;
output the encoded data comprising the images, and
determining the second key frame comprises detecting features from the images; and
estimating the position of the imaging unit comprises:
estimating the position of the imaging unit based on a relative scale by using the features; and
estimating the position of the imaging unit based on an actual distance by using the estimated position of the imaging unit based on the relative scale and the first data.

9. The estimation system of claim 7, wherein
the imaging unit is configured to:
capture images of the object; and
output the encoded data comprising the images, and
determining the second key frame comprises detecting features from the images; and
estimating the position of the imaging unit comprises:
estimating the position of the imaging unit based on a real scale by using the features and the first data corresponding to the features; and
estimating three dimensional coordinates corresponding to the features based on an actual distance.

10. The estimation system of claim 6, wherein the first data comprises a first distance between the imaging unit and the object captured on each pixel in the image and a reliability degree indicative of validity of the first distance.

11. The estimation system of claim 10, wherein the reliability degree is determined based on an index used for estimating the first distance.

12. The estimation system of claim 11, wherein the processing circuitry is configured to estimate the position of the imaging unit by further using the reliability degree.

13. The estimation system of claim 5, wherein the processing circuitry is further configured to estimate a posture of the imaging unit based on the actual distance.

14. The estimation system of claim 5, wherein the processing circuitry is further configured to estimate a first map of an area including the position of the imaging unit based on an actual distance.

15. The estimation system of claim 5, wherein:
the encoding aperture is located at an aperture part of the imaging unit, and
the aperture part comprises areas each having a point-asymmetric shape to an optical center.

16. The estimation system of claim 15, wherein the areas each pass through light rays of a wavelength band different from each other.

17. The estimation system of claim 15, wherein:
the areas comprise a first filter area and a second filter area,
a first blur function of a first image based on light rays passing through the first filter area is asymmetry,
a second blur function of a second image based on light rays passing through the second filter area is asymmetry, and
the first blur function is different from the second blur function.

18. The estimation system of claim 5, wherein the imaging unit is configured to:
use an image sensor to capture one or more images in which an actual distance between the object and the imaging unit is encoded, the image sensor comprising sensors each receiving light rays of a wavelength band different from each other; and
output the encoded data comprising the one or more images.

19. An automobile comprising:
an estimation system comprising:
a monocular imaging unit comprising a camera and an encoding aperture, the molecular imaging unit being configured to acquire an image and first data relating to a distance to an object captured in the image, the image and the first data being synchronized;

processing circuitry configured to estimate a first position of the imaging unit by:
  searching a first key frame of real scale in a work memory;
  determining second key frame of the real scale based on the image and the first data;
  determining corresponding points between features in the first key frame and features in the second key frame by calculating a similarity between the first key frame and the second key frame;
  in response to determining the corresponding points are above a first threshold, determining a difference between the corresponding points; and
  in response to determining the difference is above a second threshold, estimating the position of the imaging unit in the real scale; and
a drive system configured to move the automobile based on the first position of the imaging unit.

20. The automobile of claim 19, wherein the processing circuitry is further configured to:
  acquire a map that is input; and
  estimate a second position of the imaging unit on the map by using the first position of the imaging unit and the map.

* * * * *